(12) United States Patent
Ishikawa et al.

(10) Patent No.: US 11,293,484 B2
(45) Date of Patent: Apr. 5, 2022

(54) TAPERED ROLLER BEARING

(71) Applicant: NTN CORPORATION, Osaka (JP)

(72) Inventors: Takanori Ishikawa, Iwata (JP);
Takashi Kawai, Shizuoka (JP);
Yasuhito Fujikake, Iwata (JP);
Susumu Miyairi, Shizuoka (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 17/042,799

(22) PCT Filed: Mar. 26, 2019

(86) PCT No.: PCT/JP2019/012837
§ 371 (c)(1),
(2) Date: Sep. 28, 2020

(87) PCT Pub. No.: WO2019/189169
PCT Pub. Date: Oct. 3, 2019

(65) Prior Publication Data
US 2021/0025446 A1  Jan. 28, 2021

(30) Foreign Application Priority Data
Mar. 28, 2018 (JP) .............................. JP2018-062059

(51) Int. Cl.
*F16C 19/22* (2006.01)
*F16C 19/36* (2006.01)
(Continued)

(52) U.S. Cl.
CPC .......... *F16C 19/364* (2013.01); *F16C 19/225* (2013.01); *F16C 23/088* (2013.01);
(Continued)

(58) Field of Classification Search
CPC .... F16C 19/225; F16C 19/366; F16C 23/088; F16C 33/467; F16C 33/585; F16C 33/64;
(Continued)

(56) References Cited

U.S. PATENT DOCUMENTS 4,664,537 A    5/1987  Ascheron et al.
4,877,340 A *  10/1989 Hoeprich .............. F16C 19/364
                                                    384/571
(Continued)

FOREIGN PATENT DOCUMENTS

CN    101495766 B  *  5/2011  .......... F16C 33/6681
CN    102352888 A     2/2012
(Continued)

OTHER PUBLICATIONS

International Search Report issued in corresponding International Patent Application No. PCT/JP2019/012837, dated Jun. 11, 2019, with English translation.
(Continued)

*Primary Examiner* — Marcus Charles
(74) *Attorney, Agent, or Firm* — McDermott Will & Emery LLP

(57) ABSTRACT

In the tapered roller bearing, at least any one of an outer ring, an inner ring, and a plurality of tapered rollers includes a nitrogen enriched layer. An oil retaining hole is provided in a larger annular portion of a cage. A value of a ratio $R/R_{BASE}$ is not smaller than 0.75 and not greater than 0.87 where R represents a set radius of curvature of a larger end face of the tapered roller and $R_{BASE}$ represents a distance from a point which is an apex of a cone angle of the tapered roller to a larger flange surface of the inner ring. A ratio $R_{process}/R$ is than not lower 0.5 where $R_{process}$ represents an actual radius of curvature after grinding of the larger end face of the tapered roller and R represents a set radius of curvature.

14 Claims, 31 Drawing Sheets

(51) Int. Cl.
    *F16C 23/08*     (2006.01)
    *F16C 33/36*     (2006.01)
    *F16C 33/58*     (2006.01)
    *F16C 33/64*     (2006.01)
    *F16C 33/46*     (2006.01)
    *F16C 33/50*     (2006.01)

(52) U.S. Cl.
    CPC ............ *F16C 33/36* (2013.01); *F16C 33/467* (2013.01); *F16C 33/585* (2013.01); *F16C 33/64* (2013.01); *F16C 2223/14* (2013.01); *F16C 2240/50* (2013.01); *F16C 2240/54* (2013.01); *F16C 2240/70* (2013.01)

(58) Field of Classification Search
    CPC .............. F16C 33/6654; F16C 33/4676; F16C 2240/50; F16C 2240/70; F16C 2223/14; F16C 19/364; F16C 33/6655; F16C 2240/54; F16C 33/36
    USPC .................. 384/450, 571, 572, 576, 564–565
    See application file for complete search history.

(56) References Cited

U.S. PATENT DOCUMENTS

| | | | |
|---|---|---|---|
| 6,318,897 | B1 | 11/2001 | Shitsukawa et al. |
| 6,328,477 | B1* | 12/2001 | Tsujimoto ............ F16C 19/364 384/450 |
| 7,690,847 | B2* | 4/2010 | Ohki ........................ F16C 33/62 384/492 |
| 8,226,300 | B2* | 7/2012 | Tsujimoto ................ F16D 23/06 384/571 |
| 9,416,823 | B2* | 8/2016 | Okamoto ................. F16C 33/46 |
| 9,958,009 | B2* | 5/2018 | Shishihara ............. F16C 33/585 |
| 2009/0324155 | A1 | 12/2009 | Okamoto et al. |
| 2015/0323008 | A1* | 11/2015 | Koganei ............. F16C 33/4635 384/564 |
| 2016/0153495 | A1 | 6/2016 | Ueno |
| 2017/0227054 | A1* | 8/2017 | Kamamoto ......... F16C 33/6681 |
| 2018/0258985 | A1 | 9/2018 | Kawai |

FOREIGN PATENT DOCUMENTS

| | | | | |
|---|---|---|---|---|
| CN | 102770676 A | * | 11/2012 | ............ F16C 19/364 |
| CN | 103671858 A | * | 3/2014 | ......... F16C 33/6681 |
| CN | 203477076 U | | 3/2014 | |
| CN | 103975081 A | * | 8/2014 | ............. C22C 38/00 |
| CN | 105283684 A | | 1/2016 | |
| CN | 106224373 A | | 12/2016 | |
| CN | 107110204 A | | 8/2017 | |
| CN | 104100642 B | * | 6/2018 | ......... F16C 33/6614 |
| DE | 3533976 A1 | | 4/1986 | |
| JP | 2000-170774 A | | 6/2000 | |
| JP | 2000-257637 A | | 9/2000 | |
| JP | 2000-344100 A | | 12/2000 | |
| JP | 2001-241446 A | | 9/2001 | |
| JP | 2004144279 A | * | 5/2004 | ............. F16C 33/64 |
| JP | 2006-112557 A | | 4/2006 | |
| JP | 2006-112558 A | | 4/2006 | |
| JP | 2008-121706 A | | 5/2008 | |
| JP | 2008121706 A | * | 5/2008 | ............. F16H 55/17 |
| JP | 2009191940 A | * | 8/2009 | ......... F16C 33/4635 |
| JP | 2013221592 A | * | 10/2013 | ......... F16C 33/4676 |
| WO | WO-2011080961 A | * | 7/2011 | ............ F16C 33/508 |
| WO | WO-2018151209 A1 | * | 8/2018 | ............ F16C 33/467 |
| WO | WO-2018181317 A1 | * | 10/2018 | ............ F16C 19/364 |

OTHER PUBLICATIONS

The First Office Action issued in corresponding CN Application No. 201980022297.2, dated Dec. 3, 2021 w/Machine English Translation.

* cited by examiner

FIG.32
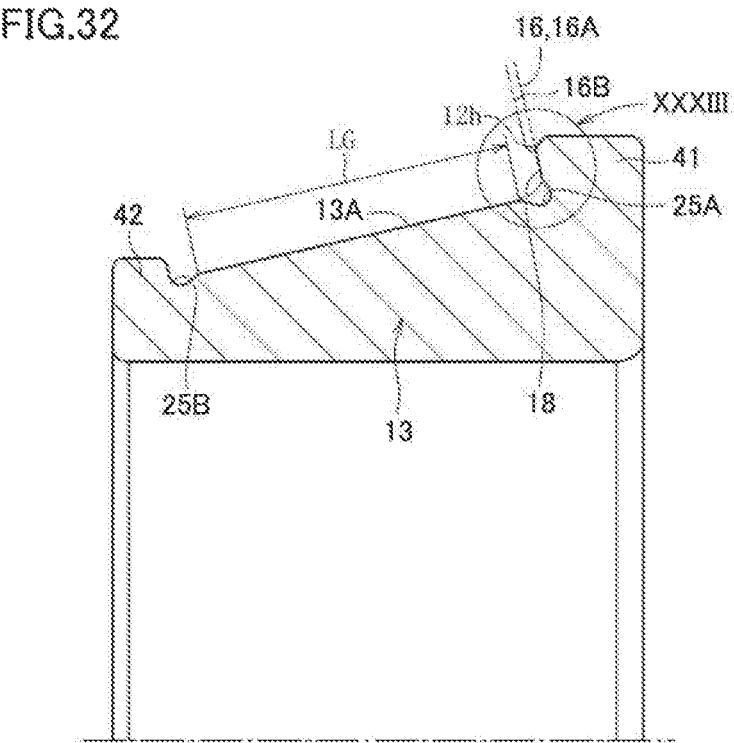
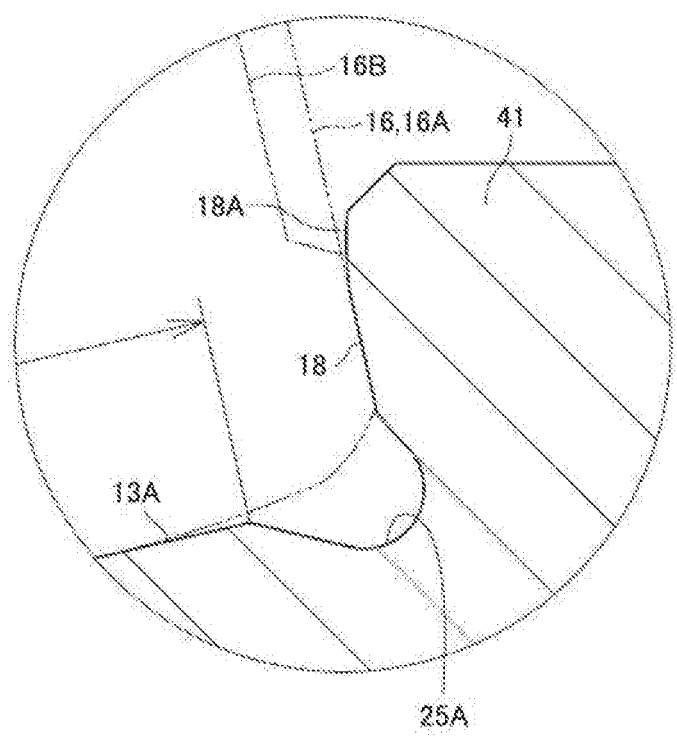

TAPERED ROLLER BEARING

CROSS-REFERENCE OF RELATED APPLICATIONS

This application is the U.S. National Phase under 35 U.S.C. § 371 of International Patent Application No. PCT/JP2019/012837, filed on Mar. 26, 2019, which in turn claims the benefit of Japanese Application No. 2018-062059, filed on Mar. 28, 2018, the entire disclosures of which Applications are incorporated by reference herein.

TECHNICAL FIELD

The present invention relates to a tapered roller bearing.

BACKGROUND ART

A tapered roller bearing has conventionally been known as one type of a bearing. The tapered roller bearing is applied, for example, to a mechanical apparatus such as an automobile and industrial machinery. The tapered roller bearing can receive certain axial load as a larger end face of a tapered roller and a larger flange surface of an inner ring are in contact with each other during use. Contact between the larger end face of the tapered roller and the larger flange surface of the inner ring described above, however, is not rolling contact but sliding contact. Therefore, when a lubrication environment in a portion of contact between the larger end face of the tapered roller and the larger flange surface of the inner ring is insufficient, heat is generated in the portion of contact and there is a concern about abrupt increase in temperature.

In order to improve seizure resistance, torque loss and heat generation due to friction in the portion of contact between the larger end face of the tapered roller and the larger flange surface of the inner ring should be lessened and oil film formability in the portion of contact should be improved.

For example, Japanese Patent Laying-Open No. 2000-170774 (which is also called PTL 1 below) has proposed setting a ratio $R/R_{BASE}$ within a range from 0.75 to 0.87 with R representing a radius of curvature of the larger end face of the tapered roller and $R_{BASE}$ representing a distance from an apex of a cone angle of the tapered roller to the larger flange surface (a portion of contact with the tapered roller) of the inner ring. According to PTL 1, by setting ratio $R/R_{BASE}$ within the numeric range above, oil film formability in the portion of contact between the larger end face of the tapered roller and the larger flange surface of the inner ring can be improved and heat generation in the portion of contact can be lessened.

CITATION LIST

Patent Literature

PTL 1: Japanese Patent Laying-Open No. 2000-170774

SUMMARY OF INVENTION

Technical Problem

PTL 1 has defined the numeric range of ratio $R/R_{BASE}$ regardless of the value of $R_{BASE}$. Therefore, the numeric range of possible values of radius of curvature R has greatly been varied depending on magnitude of $R_{BASE}$. For example, when $R_{BASE}$ is relatively small, the numeric range of possible values of radius of curvature R is also narrow, and it may be difficult to manufacture a tapered roller bearing that satisfies the condition above and achieves improved oil film formability in the portion of contact, in consideration of a dimensional tolerance allowable in manufacturing of a bearing. When $R_{BASE}$ is relatively large, the numeric range of possible values of radius of curvature R is also wide, and from a point of view of improvement in oil film formability in the portion of contact described above, the numeric range of possible values of radius of curvature R (that is, the numeric range of ratio $R/R_{BASE}$) may have to be reviewed.

PTL 1 does not define an allowable range of an actual radius of curvature after working of the larger end face of the tapered roller. Therefore, even though a value of $R/R_{BASE}$ is set within the range from 0.75 to 0.87, skew larger than expected may be induced with decrease in actual radius of curvature.

When skew occurs, tangential force generated between the larger end face of the tapered roller and the larger flange surface of the inner ring increases, which leads to increase in friction torque and generation of heat. When skew further increases, the larger end face of the tapered roller is in edge contact, which leads to metal-to-metal contact between the tapered roller and the inner ring and locking of the bearing due to heat generation. There is thus also a concern about insufficient seizure resistance.

Furthermore, when the tapered roller bearing remains stopped for a long period of time and thereafter it starts to move as well, a thickness of the oil film in the portion of contact between the larger end face of the tapered roller and the larger flange surface of the inner ring is insufficient, and consequently seizure may occur in the portion of contact between the larger end face and the larger flange surface.

The present invention was made to solve the problems as described above and an object of the present invention is to provide a tapered roller bearing excellent in seizure resistance.

Solution to Problem

A tapered roller bearing according to the present disclosure includes an outer ring, an inner ring, a plurality of tapered rollers, and a cage. The outer ring includes an outer-ring raceway surface around an inner circumferential surface thereof. The inner ring includes an inner-ring raceway surface around an outer circumferential surface thereof and a larger flange surface arranged on a larger diameter side relative to the inner-ring raceway surface, and is arranged inside relative to the outer ring. The plurality of tapered rollers each include a rolling surface in contact with the outer-ring raceway surface and the inner-ring raceway surface and a larger end face in contact with the larger flange surface. The plurality of tapered rollers are disposed between the outer-ring raceway surface and the inner-ring raceway surface. The cage includes a plurality of pockets arranged at a prescribed interval in a circumferential direction. The cage accommodates and holds the plurality of tapered rollers in respective ones of the plurality of pockets. The cage includes a smaller annular portion, a larger annular portion, and a plurality of posts. The smaller annular portion is continuous on a smaller diameter side of the plurality of tapered rollers. The larger annular portion is continuous on a larger diameter side of the plurality of tapered rollers. The plurality of posts couple the smaller annular portion and the larger annular portion to each other. The smaller annular portion, the larger annular portion, and the plurality of posts serve as partitions among the plurality of pockets. The larger annular portion is provided with an oil retaining hole. The oil retaining hole faces the pocket and holds lubricating oil. At least any one of the outer ring, the inner ring, and the plurality of tapered rollers includes a nitrogen enriched layer formed on a surface layer of the outer-ring raceway surface, the inner-ring raceway surface, or the rolling surface. A value of a ratio $R/R_{BASE}$ is not smaller than 0.75 and not greater than 0.87, where R represents a set radius of curvature of the larger end face of the tapered roller and $R_{BASE}$ represents a distance from an apex of a cone angle of the tapered roller to the larger flange surface of the inner ring. A ratio $R_{process}/R$ is not lower than 0.5, where $R_{process}$ represents an actual radius of curvature after grinding of the larger end face of the tapered roller and R represents the set radius of curvature.

Advantageous Effects of Invention

According to the above, a tapered roller bearing excellent in seizure resistance is obtained.

BRIEF DESCRIPTION OF DRAWINGS

FIG. 32 is a partial schematic cross-sectional view showing a detailed shape of the inner ring of the tapered roller bearing according to the embodiment.

FIG. 33 is an enlarged schematic diagram of a region XXXIII in FIG. 32.

DESCRIPTION OF EMBODIMENTS

Figure 1:
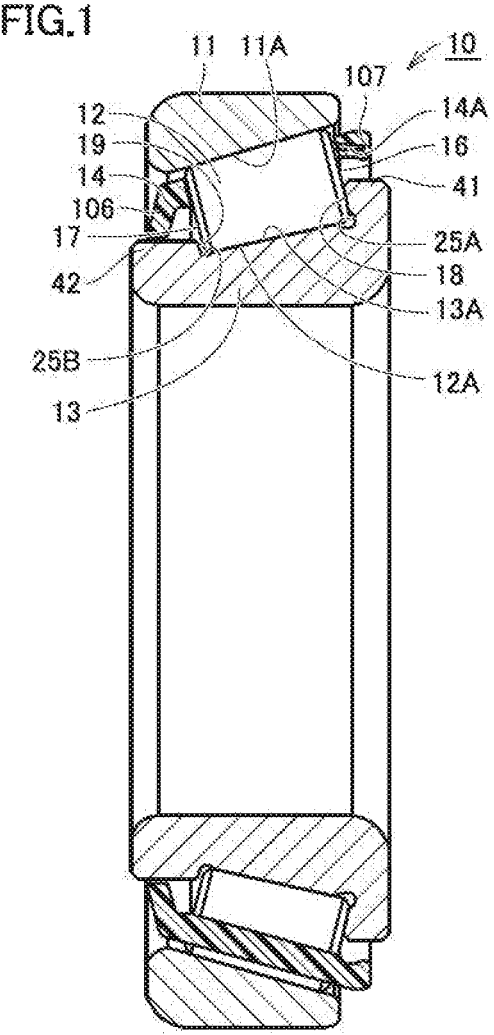
FIG. 1 is a schematic cross-sectional view showing a tapered roller bearing according to an embodiment.

An embodiment of the present invention will be described below with reference to the drawings. The same or corresponding elements in the drawings below have the same reference characters allotted and description thereof will not be repeated.

<Construction of Tapered Roller Bearing>

Figure 2:
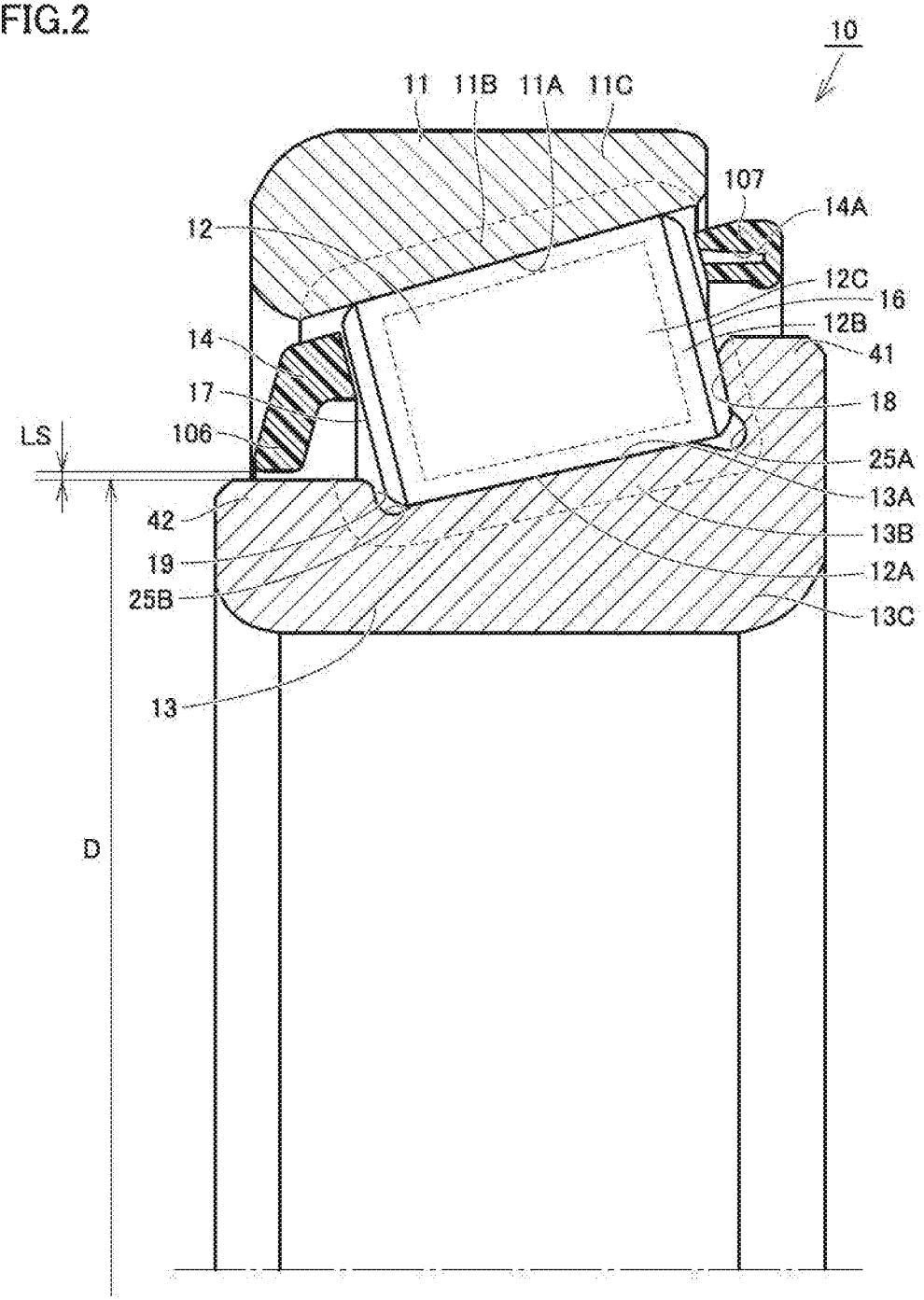
FIG. 2 is a partial schematic cross-sectional view for illustrating a nitrogen enriched layer in the tapered roller bearing according to the embodiment.
Figure 3:
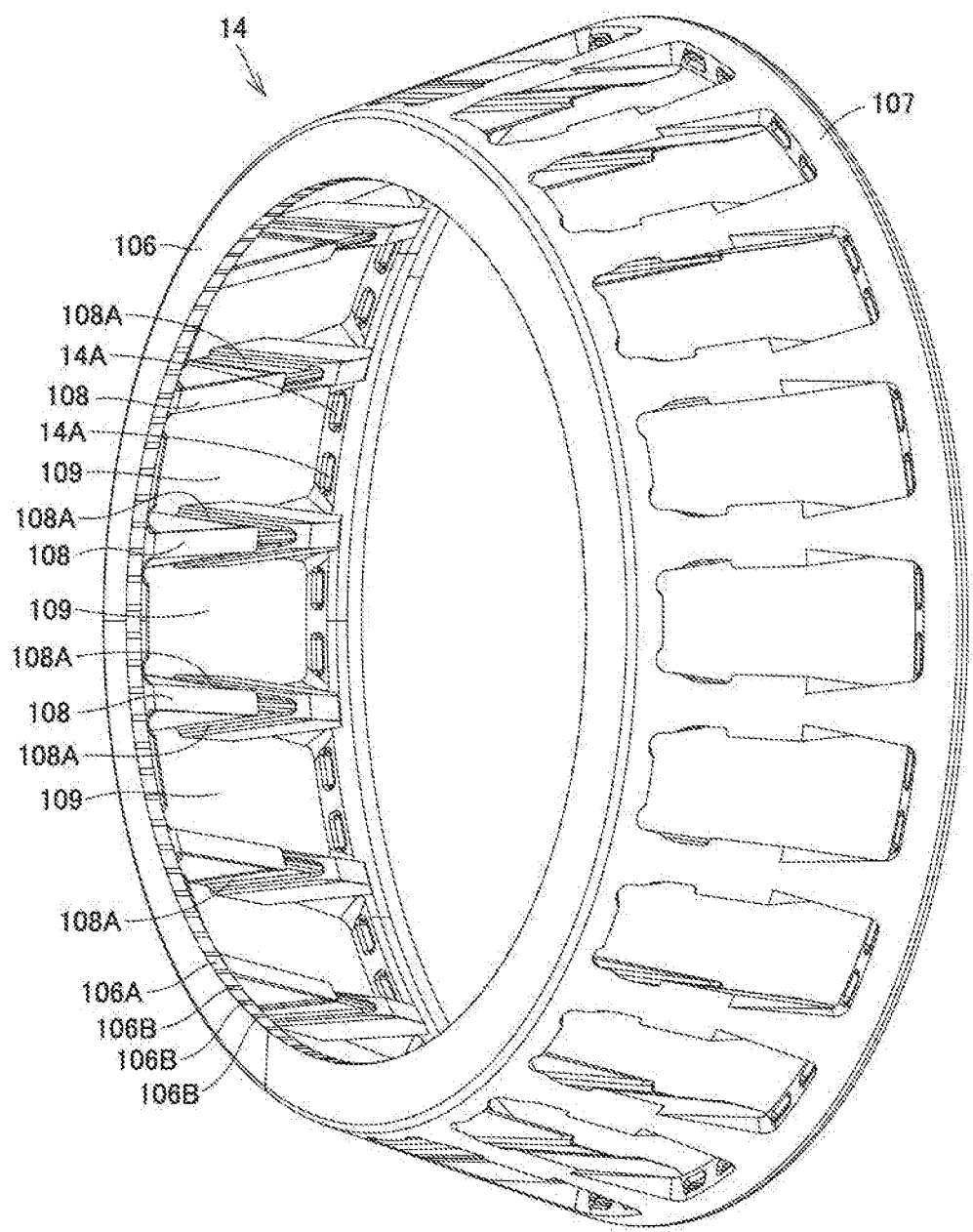
FIG. 3 is a schematic perspective view showing a cage of the tapered roller bearing according to the embodiment.
Figure 4:
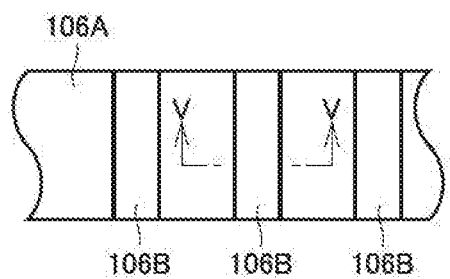
FIG. 4 is a partially enlarged schematic diagram of the cage shown in FIG. 3.
Figure 5:
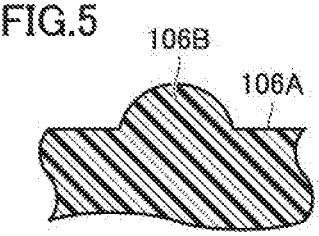
FIG. 5 is a schematic cross-sectional view along a line segment V-V in FIG. 4.
Figure 10:
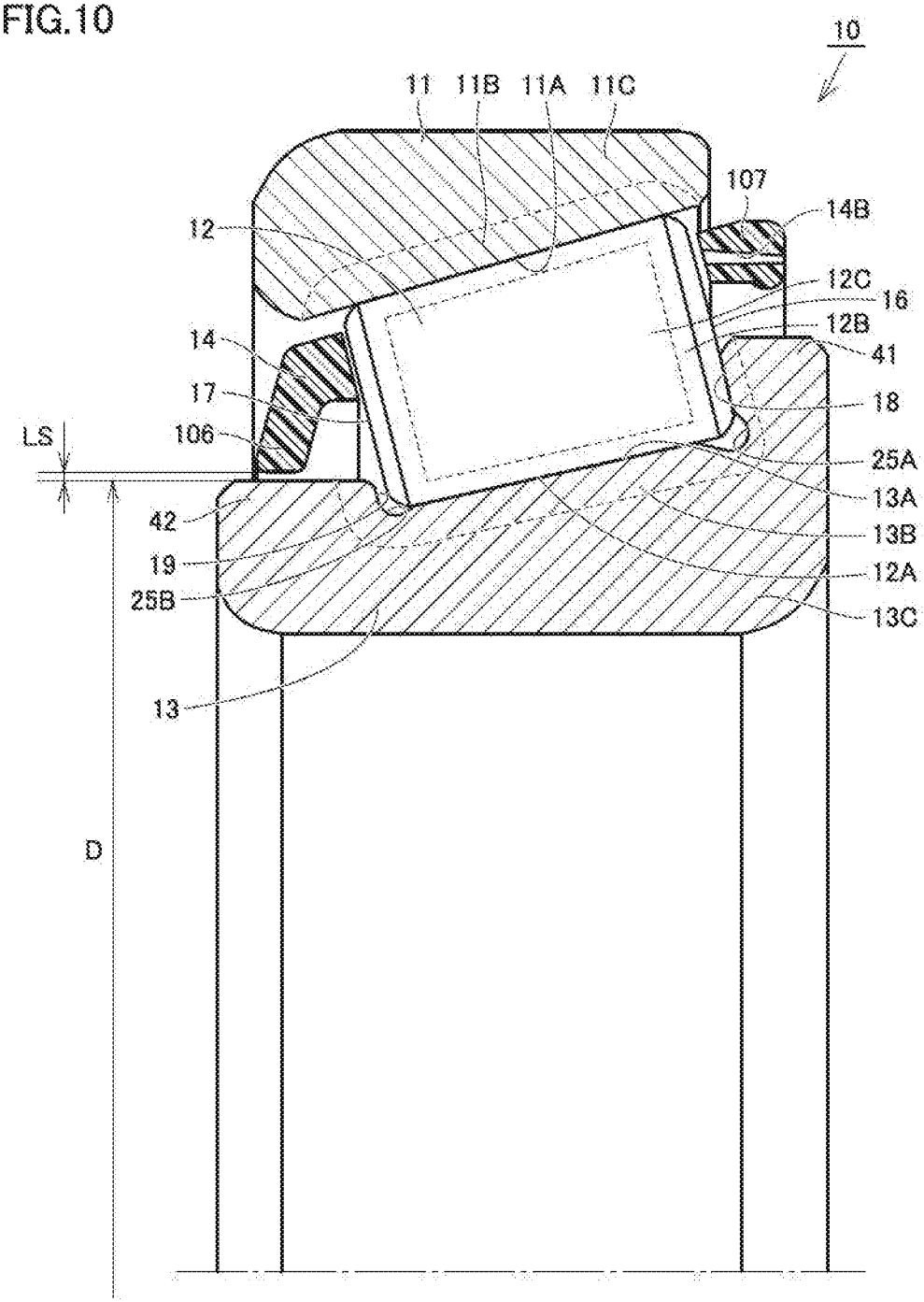
FIG. 10 is a partial schematic cross-sectional view showing a first modification of the tapered roller bearing according to the embodiment.
Figure 11:
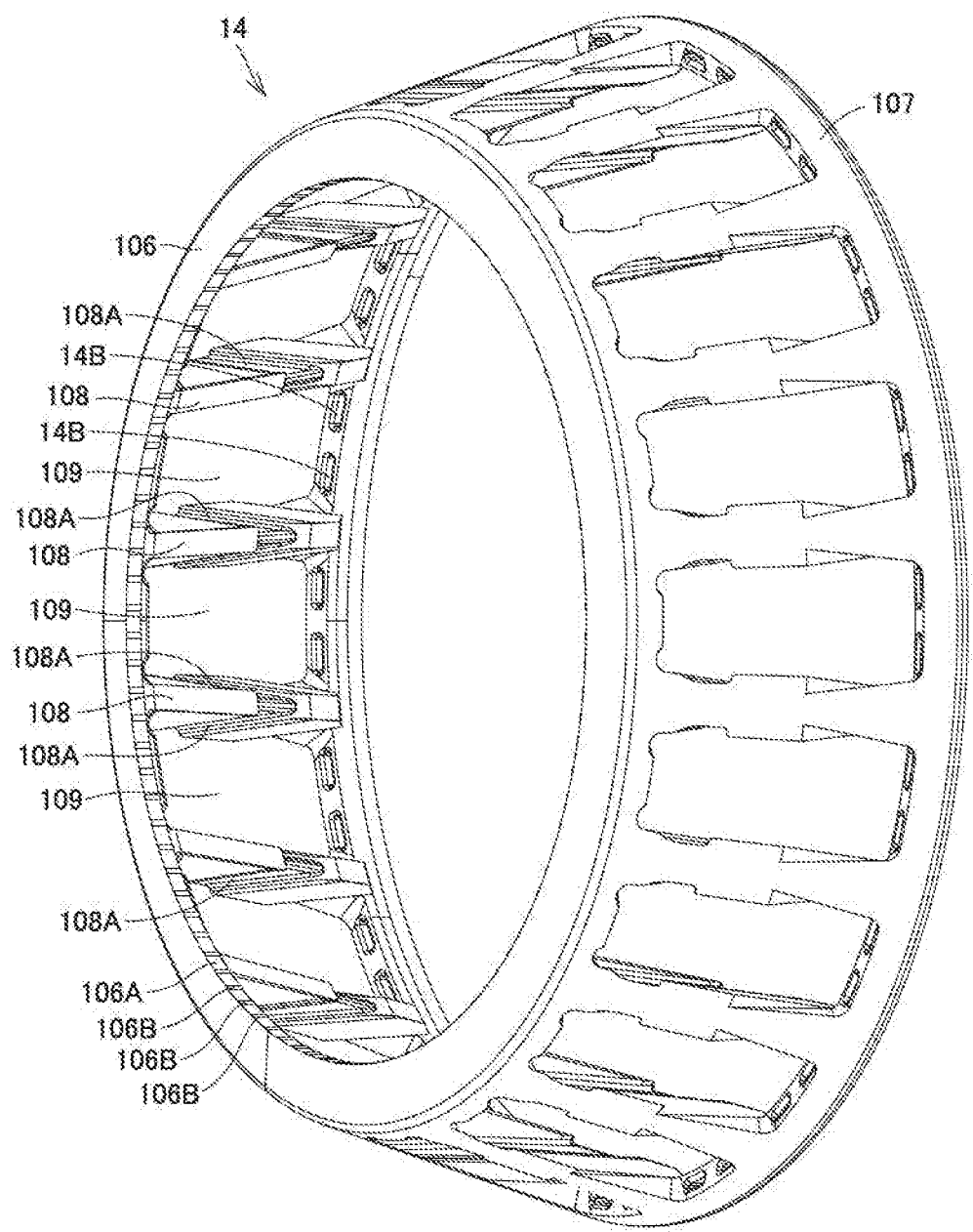
FIG. 11 is a schematic perspective view showing the cage of the tapered roller bearing shown in FIG. 10.
Figure 12:
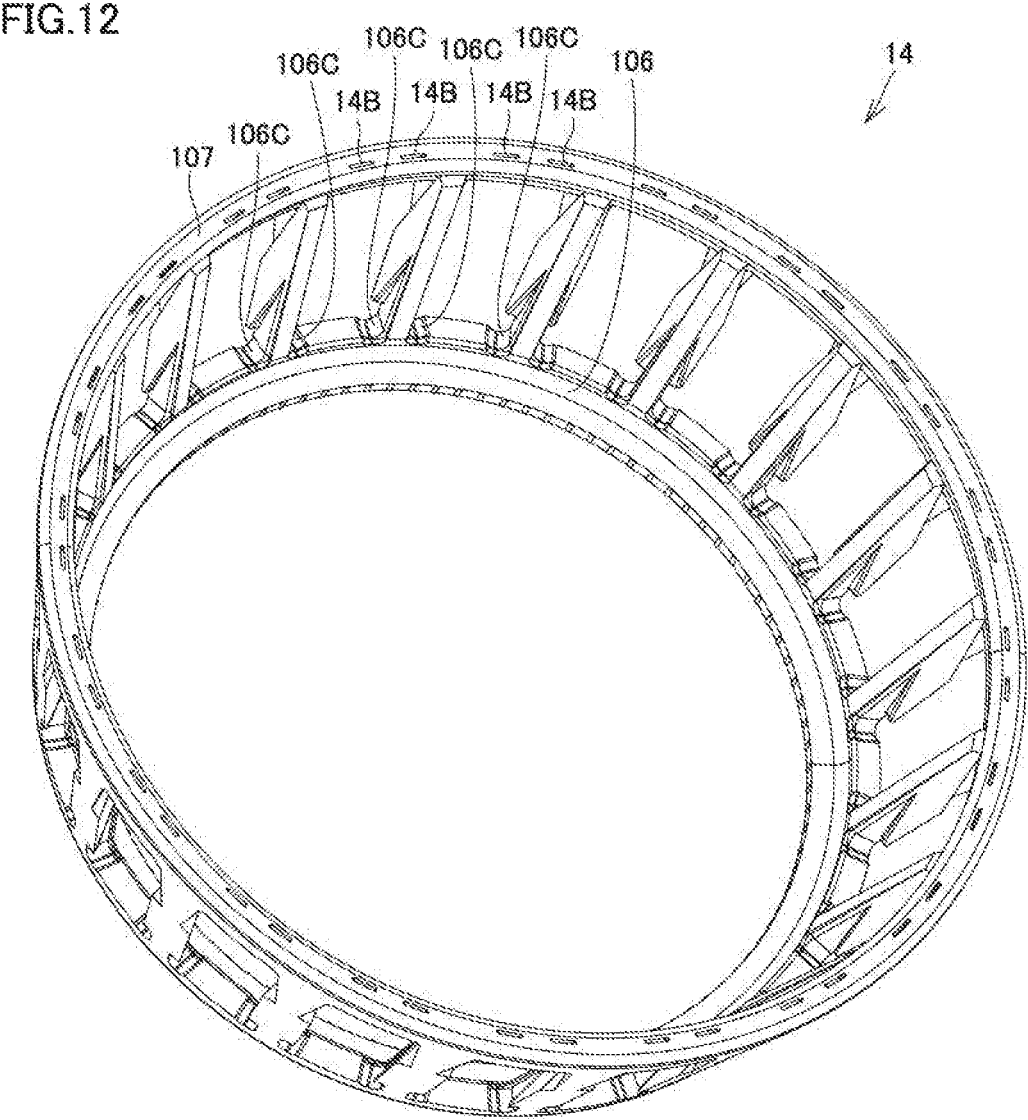
FIG. 12 is a schematic perspective view showing a first modification of the cage shown in FIG. 11.
Figure 13:
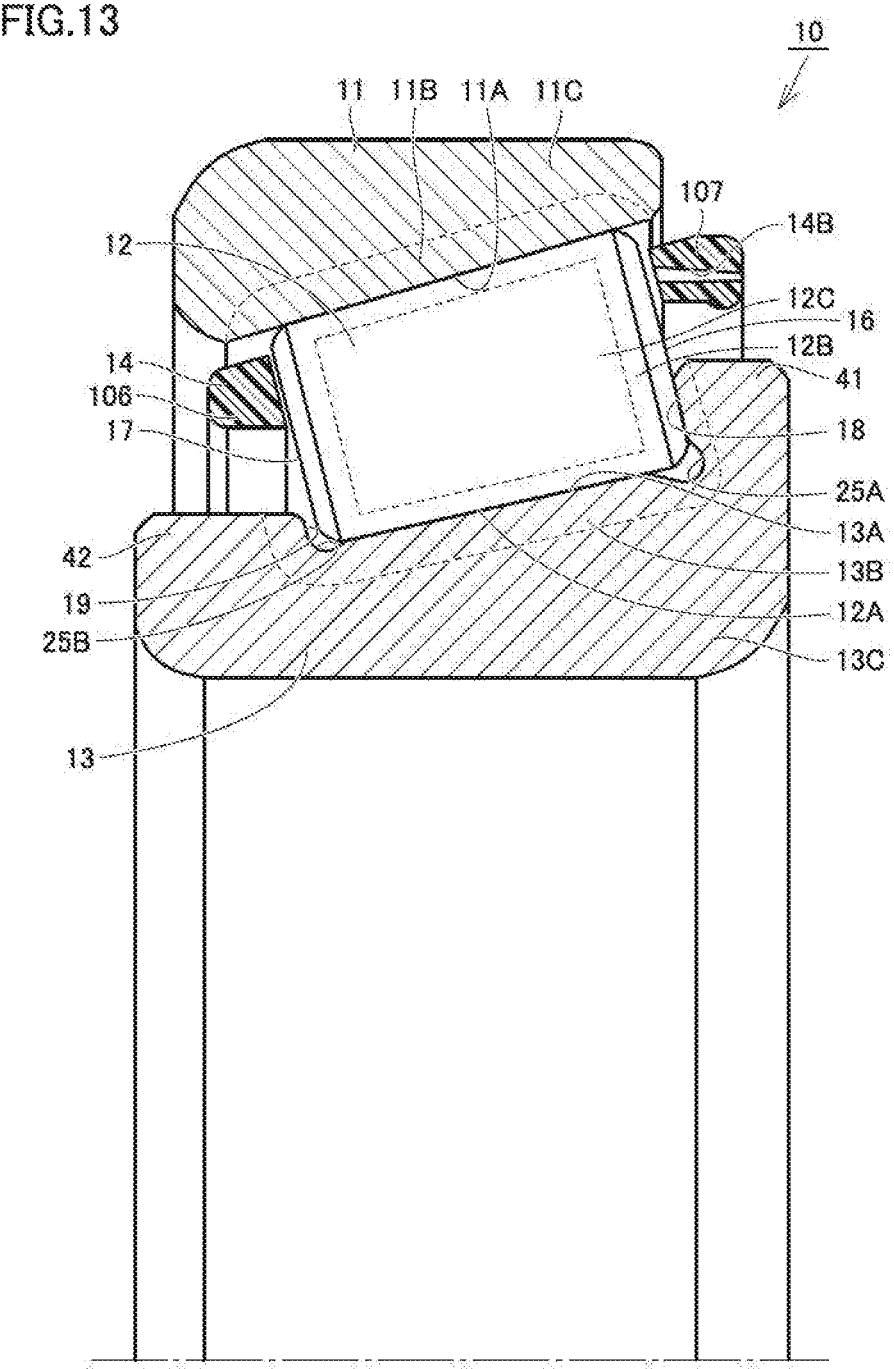
FIG. 13 is a schematic cross-sectional view showing a second modification of the cage shown in FIG. 11.
Figure 14:
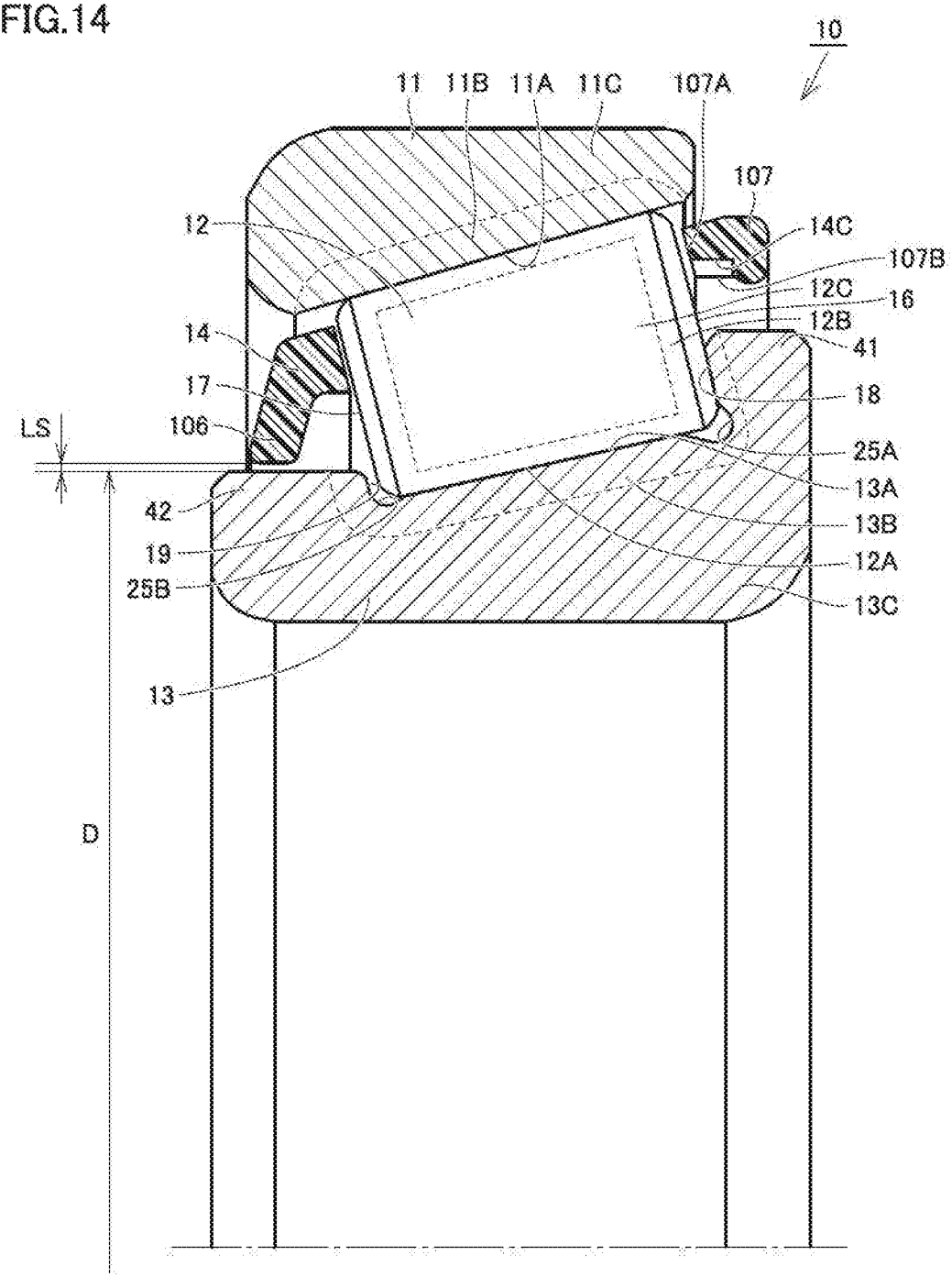
FIG. 14 is a partial schematic cross-sectional view showing a second modification of the tapered roller bearing according to the embodiment.
Figure 15:
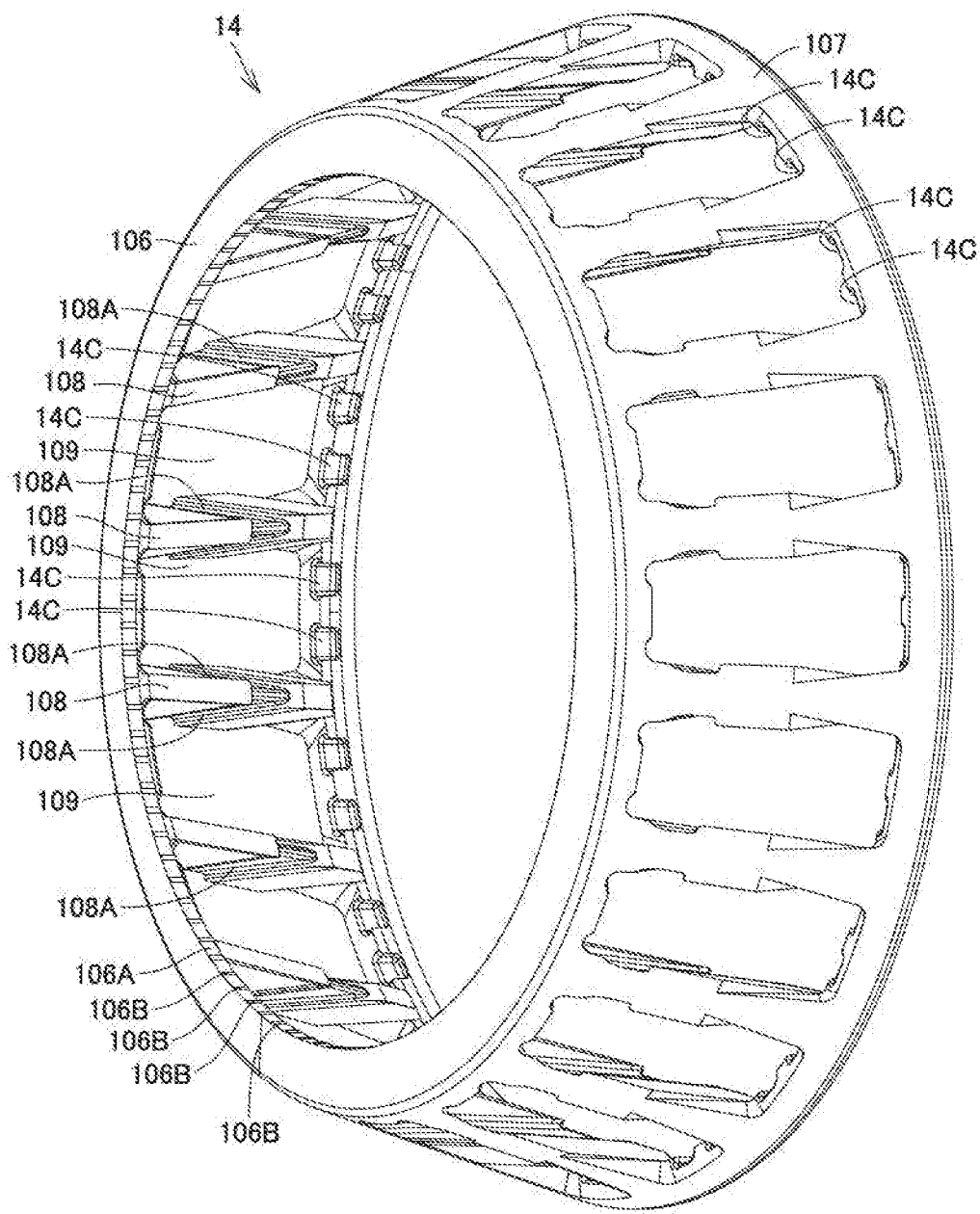
FIG. 15 is a schematic perspective view showing the cage of the tapered roller bearing shown in FIG. 14.
Figure 16:
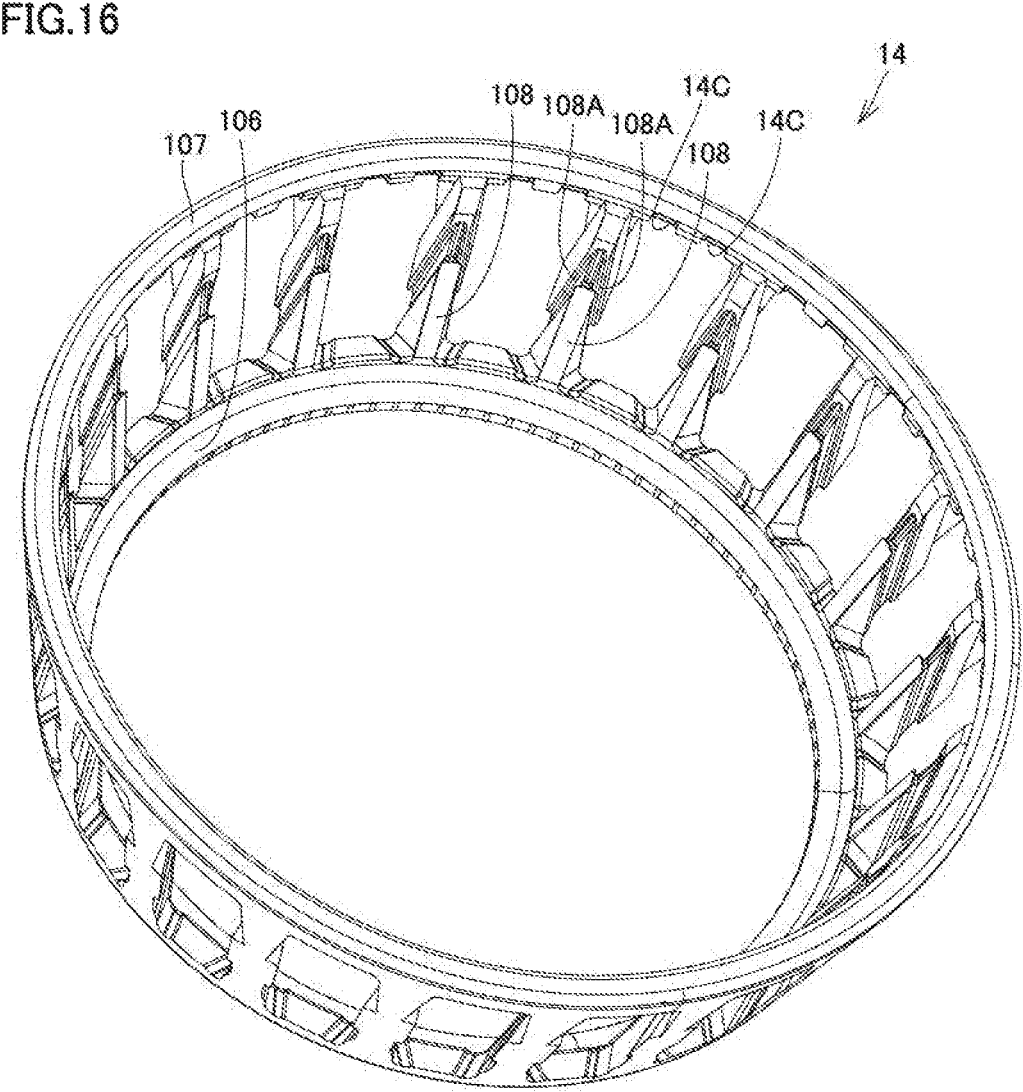
FIG. 16 is a schematic perspective view showing the cage of the tapered roller bearing shown in FIG. 14.
Figure 17:
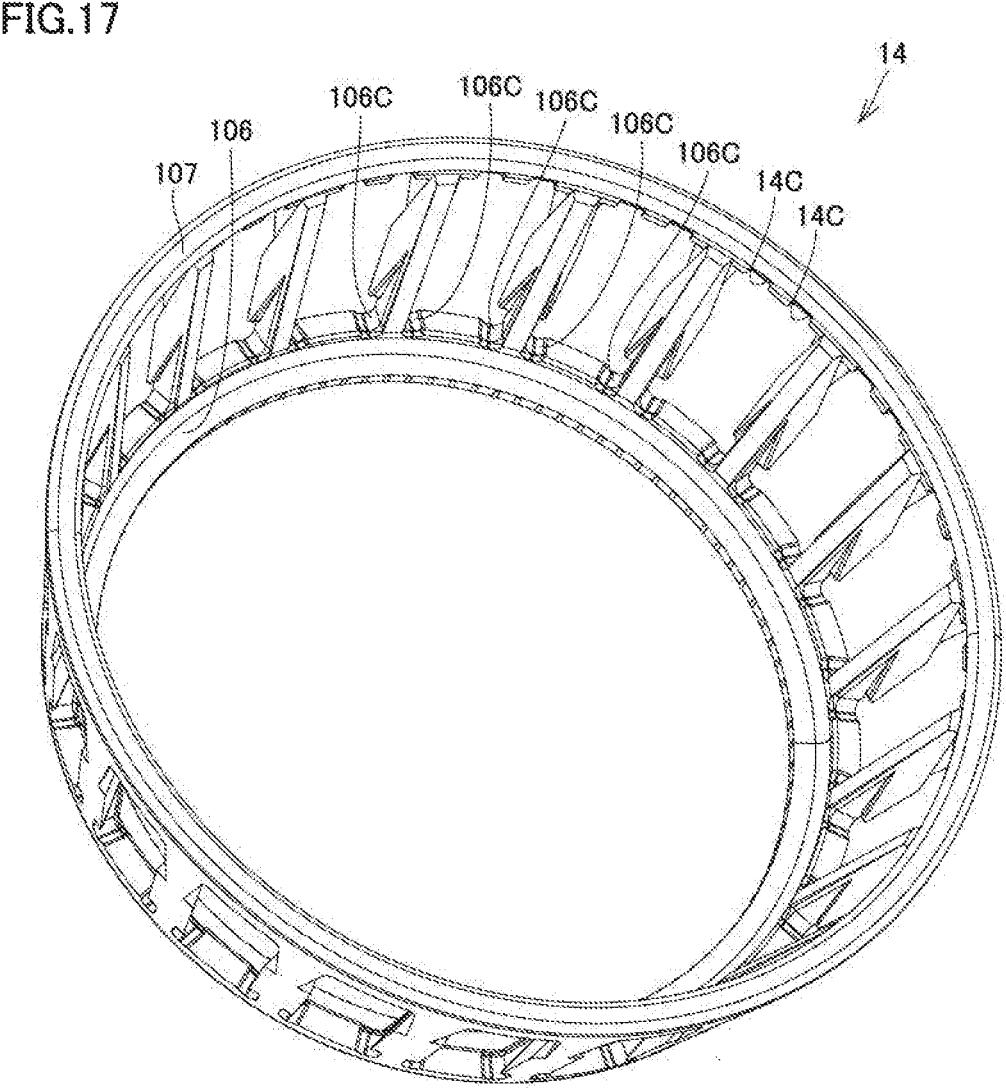
FIG. 17 is a schematic perspective view showing a first modification of the cage shown in FIG. 15.
Figure 18:
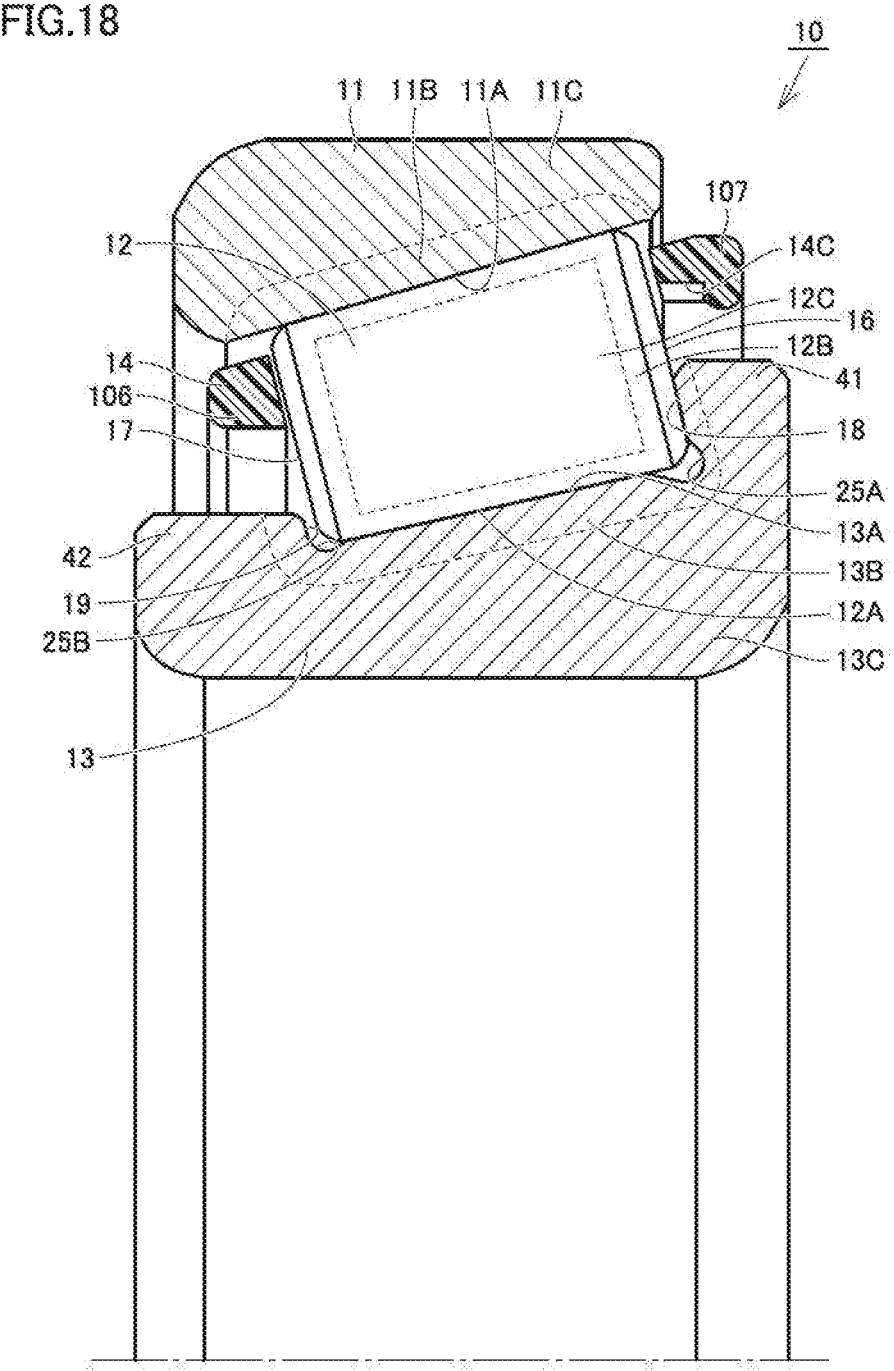
FIG. 18 is a schematic cross-sectional view showing a second modification of the cage shown in FIG. 15.
Figure 19:
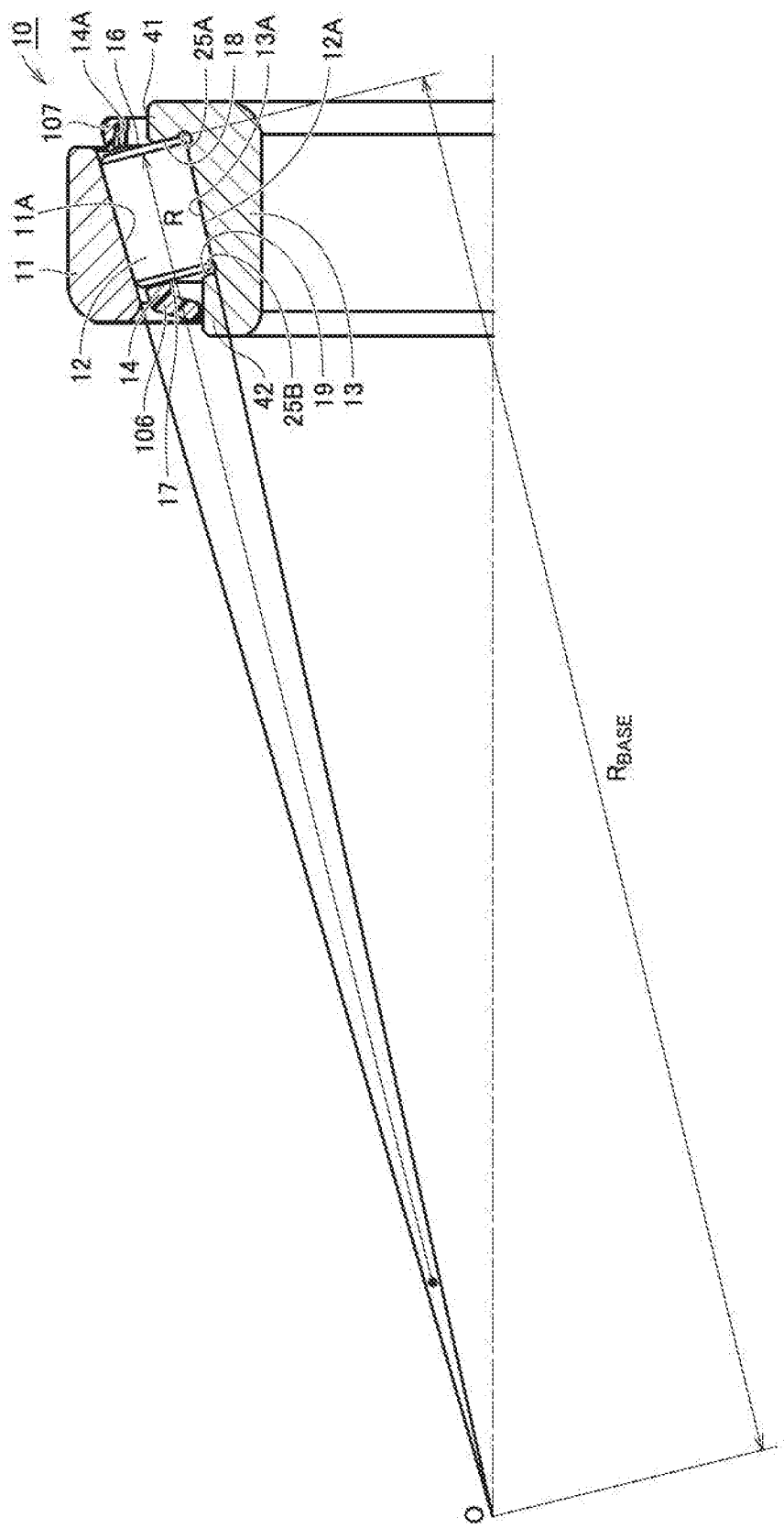
FIG. 19 is a schematic cross-sectional view showing design specifications of the tapered roller bearing according to the embodiment.
Figure 20:
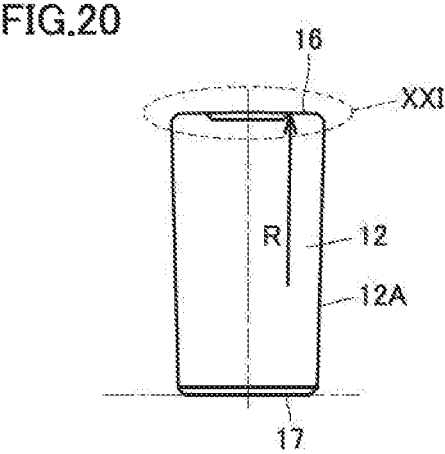
FIG. 20 is a schematic cross-sectional view for illustrating a reference radius of curvature of a roller in the tapered roller bearing according to the embodiment.
Figure 21:
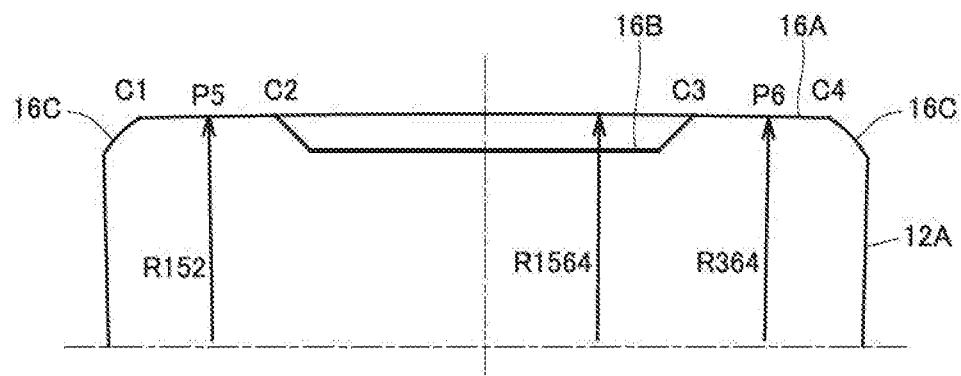
FIG. 21 is a partial schematic cross-sectional view showing a region XXI shown in FIG. 20.
Figure 22:
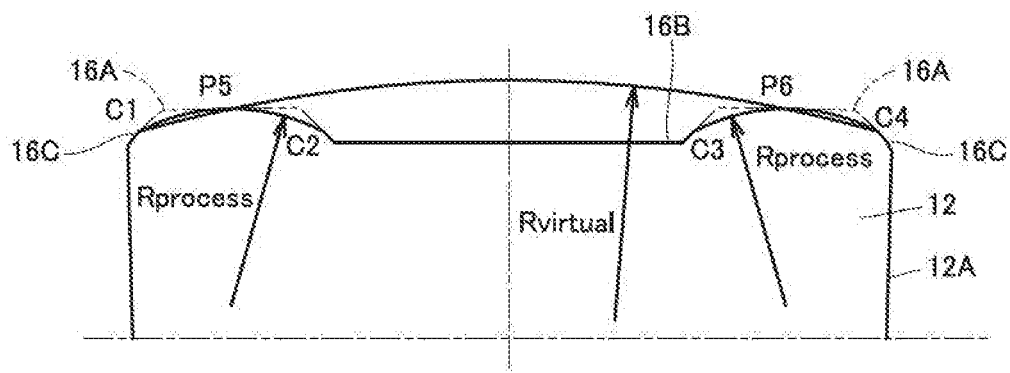
FIG. 22 is a schematic cross-sectional view for illustrating an actual radius of curvature of the roller in the tapered roller bearing according to the embodiment.
Figure 23:
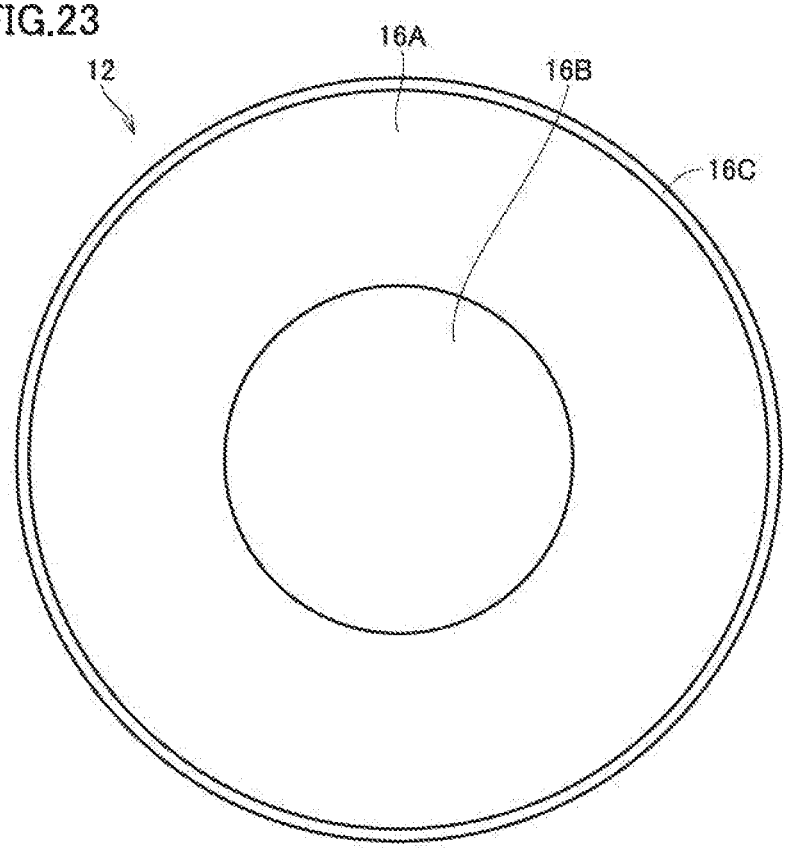
FIG. 23 is a schematic plan view showing a larger end face of the tapered roller of the tapered roller bearing according to the embodiment.

FIG. 1 is a schematic cross-sectional view of a tapered roller bearing according to an embodiment of the present invention. FIG. 2 is a partial schematic cross-sectional view of the tapered roller bearing shown in FIG. 1. FIG. 3 is a schematic perspective view showing a cage of the tapered roller bearing according to the embodiment. FIG. 4 is a partially enlarged schematic diagram of the cage shown in FIG. 3. FIG. 5 is a schematic cross-sectional view along a line segment V-V in FIG. 4. FIGS. 6 to 9 are schematic diagrams showing first to fourth modifications of the cage shown in FIG. 3. FIG. 10 is a partial schematic cross-sectional view showing a first modification of the tapered roller bearing according to the embodiment of the present invention. FIG. 11 is a schematic perspective view showing the cage of the tapered roller bearing shown in FIG. 10. FIGS. 12 and 13 are schematic diagrams showing first and second modifications of the cage shown in FIG. 11. FIG. 14 is a partial schematic cross-sectional view showing a second modification of the tapered roller bearing according to the embodiment. FIG. 15 is a schematic perspective view showing the cage of the tapered roller bearing shown in FIG. 14. FIG. 16 is a schematic perspective view showing the cage of the tapered roller bearing shown in FIG. 14. FIGS. 17 and 18 are schematic perspective views showing first and second modifications of the cage shown in FIG. 15. FIG. 19 is a schematic cross-sectional view showing design specifications of the tapered roller bearing shown in FIGS. 1 to 18. FIG. 20 is a schematic cross-sectional view for illustrating a reference radius of curvature of a roller in the tapered roller bearing according to the embodiment of the present invention. FIG. 21 is a partial schematic cross-sectional view showing a region XXI shown in FIG. 20. FIG. 22 is a schematic cross-sectional view for illustrating an actual radius of curvature of the roller in the tapered roller bearing according to the embodiment of the present invention. FIG. 23 is a schematic plan view showing a larger end face of the tapered roller of the tapered roller bearing according to the embodiment of the present invention. The tapered roller bearing according to the present embodiment will be described with reference to FIGS. 1 to 23.

A tapered roller bearing 10 shown in FIG. 1 mainly includes an outer ring 11, an inner ring 13, a plurality of tapered rollers (which may also simply be called a roller below) 12, and a cage 14. Outer ring 11 has an annular shape, and includes an outer-ring raceway surface 11A around its inner circumferential surface. Inner ring 13 has an annular shape, and includes an inner-ring raceway surface 13A around its outer circumferential surface. Inner ring 13 is arranged on an inner circumferential side of outer ring 11 such that inner-ring raceway surface 13A faces outer-ring raceway surface 11A. In the description below, a direction along a central axis of tapered roller bearing 10 is referred to as an "axial direction," a direction orthogonal to the central axis is referred to as a "radial direction," and a direction along a circular arc around the central axis is referred to as a "circumferential direction."

Rollers 12 are arranged on the inner circumferential surface of outer ring 11. Roller 12 has a roller rolling surface 12A and comes in contact with inner-ring raceway surface 13A and outer-ring raceway surface 11A at roller rolling surface 12A. The plurality of rollers 12 are arranged at prescribed pitches in the circumferential direction in cage 14 made of a resin. Thus, roller 12 is held on the annular raceway of outer ring 11 and inner ring 13 in a rollable manner. Tapered roller bearing 10 is constructed such that the apex of a cone including outer-ring raceway surface 11A, the apex of a cone including inner-ring raceway surface 13A, and the apex of a cone including the locus of a rotation axis of roller 12 when the roller rolls meet at one point (a point O in FIG. 19) on the centerline of the bearing. According to such a construction, outer ring 11 and inner ring 13 of tapered roller bearing 10 are rotatable relative to each other. Inner ring 13 includes a larger flange portion 41 on a larger diameter side of inner-ring raceway surface 13A and a smaller flange portion 42 on a smaller diameter side.

As shown in FIG. 3, cage 14 includes a plurality of pockets 109 arranged at a prescribed interval in a circumferential direction. Cage 14 accommodates and holds the plurality of tapered rollers 12 in respective ones of the plurality of pockets 109. Cage 14 includes a smaller annular portion 106, a larger annular portion 107, and a plurality of posts 108. Smaller annular portion 106 is continuous on the smaller diameter side of the plurality of tapered rollers 12. Larger annular portion 107 is continuous on the larger diameter side of the plurality of tapered rollers 12. The plurality of posts 108 couple smaller annular portion 106 and larger annular portion 107 to each other. Smaller annular portion 106, larger annular portion 107, and the plurality of posts 108 serve as partitions among the plurality of pockets 109. Larger annular portion 107 is provided with an oil retaining hole 14A that is a non-penetrating hole. Oil retaining hole 14A includes an opening that faces pocket 109. Oil retaining hole 14A in the present embodiment is constructed to introduce lubricating oil by a capillary phenomenon and holds lubricating oil.

Oil retaining hole 14A is provided in a surface of larger annular portion 107 that faces tapered roller 12. Oil retaining hole 14A extends in a direction along a central axis of annular cage 14. Oil retaining hole 14A shown in FIG. 2 does not penetrate larger annular portion 107 and oil retaining hole 14A has a bottom located inside larger annular portion 107. From a different point of view, in the direction along the central axis, oil retaining hole 14A is shorter in length than larger annular portion 107. A width of oil retaining hole 14A in a radial direction of cage 14 which is a direction orthogonal to the central axis may be, for example, not greater than 2 mm. In this case, surface tension of lubricating oil is dominant in the inside of oil retaining hole 14A and lubricating oil can effectively be held in the inside of oil retaining hole 14A. Oil retaining hole 14A is largest in opening width on a side of pocket 109. The width of oil retaining hole 14A in the radial direction may gradually decrease from a side of the opening toward the bottom. The opening in oil retaining hole 14A can be in any shape such as a circular shape, a rectangular shape, an elliptical shape, or a quadrangular shape having a corner curved.

The number of oil retaining holes 14A that face one pocket 109 may be set to one, or two as shown in FIG. 3. The number of oil retaining holes 14A that face one pocket 109 may be set to three or more. Oil retaining hole 14A is preferably arranged to face larger end face 16 of tapered roller 12. A distance LS between an inner-circumferential-side end face of smaller annular portion 106 of cage 14 and a surface of smaller flange portion 42 of inner ring 13 is preferably not larger than 1.0% of an outer diameter D of smaller flange portion 42 of inner ring 13. Distance LS may be not larger than 0.08% of outer diameter D of smaller flange portion 42.

In post 108 of cage 14, an oil groove 108A is provided in a side surface that faces pocket 109. Oil groove 108A is provided to extend from an inner circumferential side toward the outer circumference in the radial direction of cage 14. Oil groove 108A has an outer-circumferential-side end located closer to smaller annular portion 106 than a position of an inner-circumferential-side end. As shown in FIG. 3, oil groove 108A is provided in each of two side surfaces of one post 108. In post 108, a connection groove is provided on the inner circumferential side in the radial direction of cage 14 so as to connect two oil grooves 108A to each other. The number of oil grooves 108A in one side surface may be set to one as shown in FIG. 3, or may be set to two or more.

Figure 6:
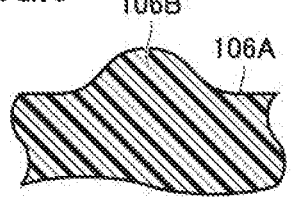
FIG. 6 is a schematic cross-sectional view showing a first modification of the cage shown in FIG. 3.
Figure 7:
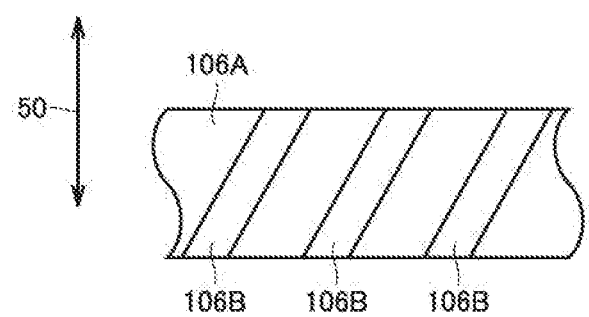
FIG. 7 is an enlarged schematic diagram showing a second modification of the cage shown in FIG. 3.

On the inner-circumferential-side end face in smaller annular portion 106 of cage 14, a plurality of protrusions 106B that protrude from a flat portion 106A are formed as shown in FIGS. 3 and 4. Protrusion 106B is formed to extend in the direction along the central axis of cage 14. As shown in FIG. 5, protrusion 106B has a semi-circular cross-sectional shape in a direction intersecting with the central axis of cage 14. Protrusion 106B may have any other cross-sectional shape such as a projecting shape having a surface curved like a sinusoidal shape as shown in FIG. 6, or a triangular shape, a trapezoidal shape, or an elliptical shape. A width of protrusion 106B in the circumferential direction of cage 14 may be constant or locally different. For example, in the direction along the central axis of cage 14, protrusion 106B may be constructed such that the width thereof gradually decreases from one end toward the other end. Though protrusion 106B of cage 14 extends along the central axis of cage 14 as shown in FIG. 4, it may extend in a direction inclined with respect to the central axis as shown in FIG. 7.

Figure 8:
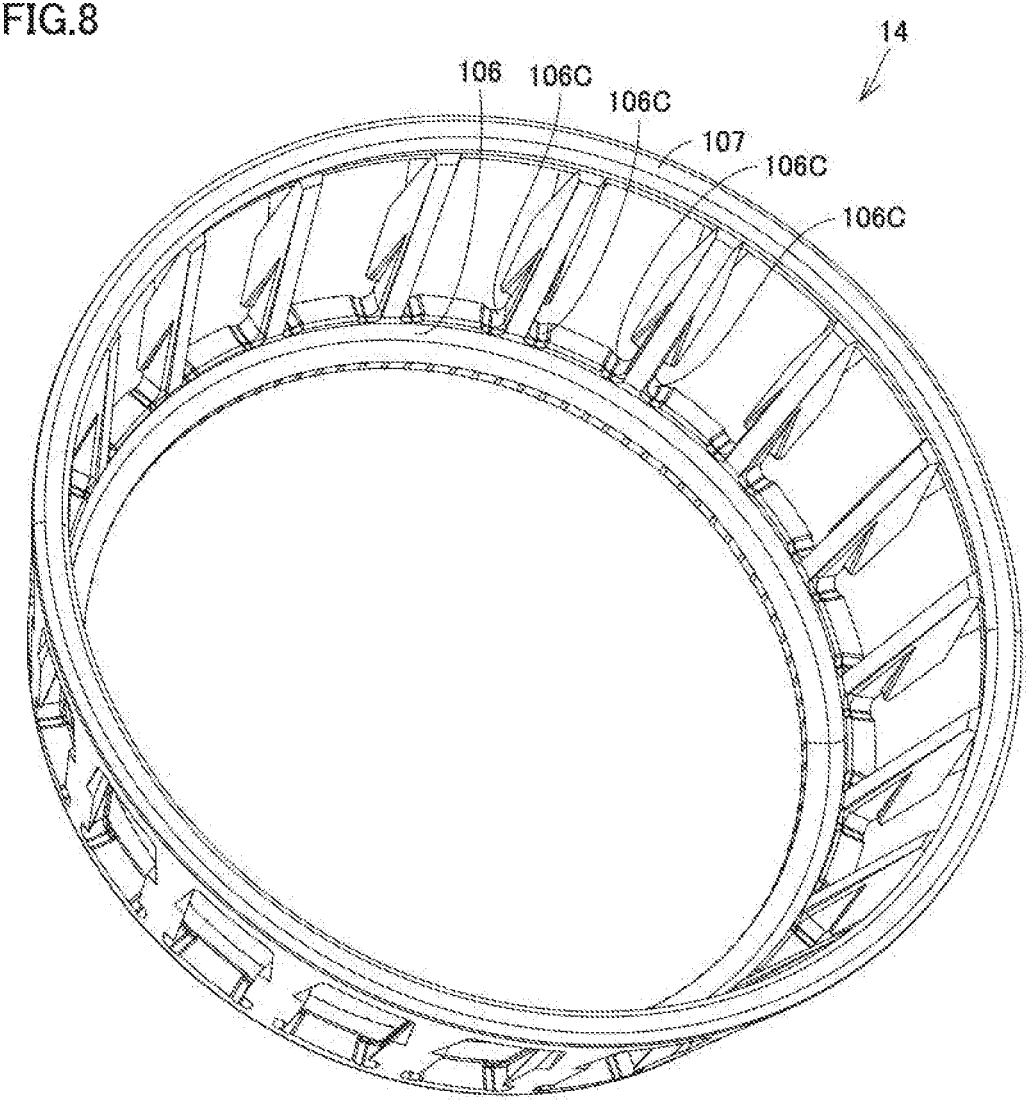
FIG. 8 is a schematic perspective view showing a third modification of the cage shown in FIG. 3.

As shown in FIG. 8, a portion of connection between post 108 of cage 14 and smaller annular portion 106 may be provided with a notch 106C. Notch 106C has a surface curved.

Figure 9:
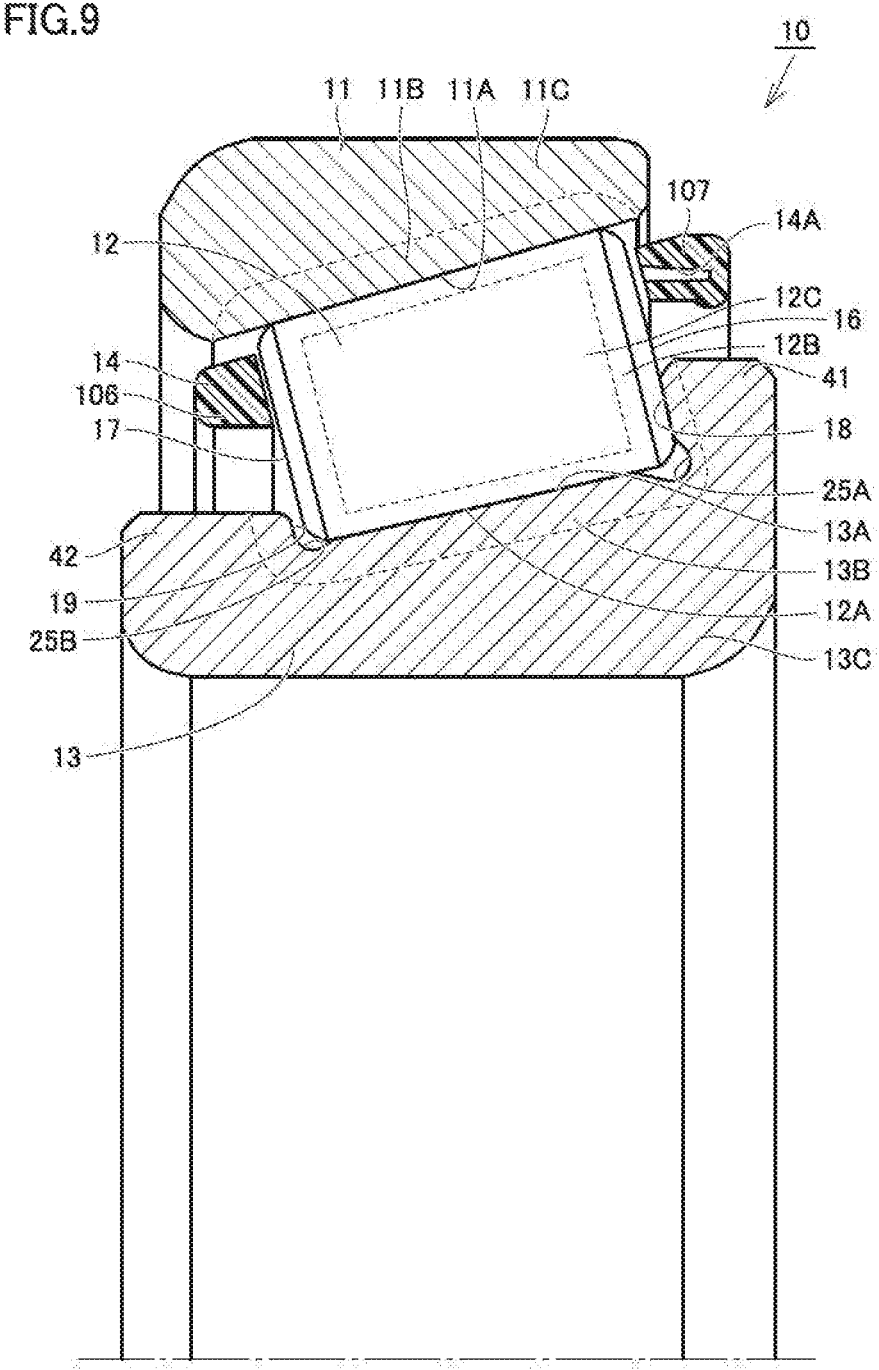
FIG. 9 is a schematic cross-sectional view showing a fourth modification of the cage shown in FIG. 3.

The shape of cage 14 may be such that a sufficient gap is provided between smaller annular portion 106 and inner ring 13 as shown in FIG. 9, instead of such a construction that smaller annular portion 106 extends toward inner ring 13 as shown in FIGS. 1 to 3. In other words, smaller annular portion 106 may include no bent portion that is bent toward inner ring 13 as shown in FIG. 2 but the smaller annular portion may be made only from a portion extending in the direction along the central axis of roller 12 as shown in FIG. 9.

A construction in the first modification of the tapered roller bearing according to the present embodiment shown in FIGS. 10 to 13 will now be described. Though the tapered roller bearing shown in FIGS. 10 and 11 is basically similar in construction to the tapered roller bearing shown in FIGS. 1 to 3, it is different from the tapered roller bearing shown in FIGS. 1 to 3 in structure of an oil retaining hole 14B in the cage. In the tapered roller bearing shown in FIGS. 10 and 11, oil retaining hole 14B in cage 14 penetrates larger annular portion 107 to reach a surface located opposite to pocket 109 in larger annular portion 107. Oil retaining hole 14B extends in the direction along the central axis of annular cage 14. A width of oil retaining hole 14B in the radial direction of cage 14 may be, for example, not greater than 2 mm. Oil retaining hole 14B is largest in opening width on the side of pocket 109. The width of oil retaining hole 14B in the radial direction may gradually decrease from the side of the opening toward the surface located opposite to pocket 109. The opening in oil retaining hole 14B may be in any shape similarly to oil retaining hole 14A. The number of oil retaining holes 14B that face one pocket 109 may be set to one, or two or more. Cage 14 of the tapered roller bearing shown in FIGS. 10 and 11 is similar in shape of oil groove 108A or protrusion 106B to cage 14 shown in FIGS. 1 to 3, except for oil retaining hole 14B described above.

As shown in FIG. 12, in cage 14 provided with oil retaining hole 14B which is a through hole, similarly to the cage shown in FIG. 8, a portion of connection between post 108 of cage 14 and smaller annular portion 106 may be provided with notch 106C. As shown in FIG. 13, in cage 14 provided with oil retaining hole 14B which is a through hole, smaller annular portion 106 may include no bent portion that is bent toward inner ring 13 as shown in FIG. 10 but the smaller annular portion may be made only from a portion extending in the direction along the central axis of roller 12 as shown in FIG. 13.

A construction of the second modification of the tapered roller bearing according to the present embodiment shown in FIGS. 14 to 18 will now be described. Though the tapered roller bearing shown in FIGS. 14 to 16 is basically similar in construction to the tapered roller bearing shown in FIGS. 1 to 3, it is different from the tapered roller bearing shown in FIGS. 1 to 3 in structure of an oil retaining hole 14C in the cage. In the tapered roller bearing shown in FIGS. 14 to 16, larger annular portion 107 of cage 14 includes a pocket-side surface portion 107A that faces pocket 109 and an inner-ring-side surface portion 107B that is continuous to pocket-side surface portion 107A and faces inner ring 13. An opening in oil retaining hole 14C is provided to extend from pocket-side surface portion 107A to inner-ring-side surface portion 107B. From a different point of view, oil retaining hole 14C is a recess provided to connect pocket-side surface portion 107A and inner-ring-side surface portion 107B to each other. Oil retaining hole 14C is rectangular when viewed from the inside in the radial direction.

A depth of oil retaining hole 14C in the radial direction of cage 14 may be, for example, not larger than 2 mm or may exceed 2 mm. Oil retaining hole 14C may have a largest opening width on the side of pocket 109. The depth of oil retaining hole 14C in the radial direction may gradually decrease from the side of the opening toward the surface located opposite to pocket 109. The opening of oil retaining hole 13C in pocket-side surface portion 107A may be in any shape such as a semi-circular shape, a U shape, or a rectangular shape. The number of oil retaining holes 14C that face one pocket 109 may be set to one, or two or more. Cage 14 of the tapered roller bearing shown in FIGS. 14 to 16 is similar in shape of oil groove 108A or protrusion 106B to cage 14 shown in FIGS. 1 to 3, except for oil retaining hole 14C described above.

Larger annular portion 107 includes a weld line. Specifically, the weld line is provided between adjacent oil retaining holes 14C. Thus, as compared with the construction in which the weld line is provided at a position superimposed on the oil retaining hole in the circumferential direction, oil retaining hole 14C of which strength is ensured can be provided.

As shown in FIG. 17, in cage 14 provided with oil retaining hole 14C which is a recess, similarly to the cage shown in FIG. 8, a portion of connection between post 108 of cage 14 and smaller annular portion 106 may be provided with notch 106C. As shown in FIG. 18, in cage 14 provided with oil retaining hole 14C which is a recess, smaller annular portion 106 may include no bent portion that is bent toward inner ring 13 as shown in FIG. 14 but the smaller annular portion may be made only from a portion extending in the direction along the central axis of roller 12 as shown in FIG. 18.

Outer ring 11, inner ring 13, and roller 12 may be formed of steel. Steel at least contains at least 0.6 mass % and at most 1.2 mass % of carbon (C), at least 0.15 mass % and at most 1.1 mass % of silicon (Si), and at least 0.3 mass % and at most 1.5 mass % of manganese (Mn) in a portion other than nitrogen enriched layers 11B, 12B, and 13B. Steel may further contain at most 2.0 mass % of chromium (Cr).

In the above construction, when a carbon content exceeds 1.2 mass %, cold workability is impaired by a high hardness of a material in spite of spheroidizing annealing, and a sufficient amount of cold working and sufficient working accuracy cannot be obtained in cold working. In addition, an over-carburized structure tends to be formed during carbonitriding treatment and cracking strength may be lowered. When the carbon content is lower than 0.6 mass %, it takes a long time to ensure a required surface hardness and a required amount of retained austenite, and it is difficult to obtain a required internal hardness in quenching after reheating.

The Si content of 0.15 to 1.1 mass % is set because Si can increase resistance against softening by tempering to ensure heat resistance and thus improve rolling fatigue life characteristics under lubrication with foreign matters being introduced. When the Si content is less than 0.15 mass %, the rolling fatigue life characteristics under lubrication with foreign matters being introduced are not improved. When the Si content exceeds 1.1 mass %, hardness after normalizing becomes too high to impair cold workability.

Mn is effective for ensuring hardenability of a carbonitrided layer and a core portion. When the Mn content is less than 0.3 mass %, sufficient hardenability cannot be obtained and sufficient strength cannot be ensured in the core portion. When the Mn content exceeds 1.5 mass %, hardenability becomes excessive and a hardness after normalizing becomes high and cold workability is impaired. Furthermore, austenite is excessively stabilized, which leads to an excessive amount of retained austenite in the core portion and acceleration of dimensional change over time. When steel contains at most 2.0 mass % of chromium, a carbide or a nitride of chromium is precipitated at a surface layer portion and a hardness of the surface layer portion can easily be enhanced. The Cr content of at most 2.0 mass % is set because the Cr content exceeding 2.0 mass % leads to significant lowering in cold workability and the content exceeding 2.0 mass % is less in effect of enhancement to a hardness of the surface layer portion.

Naturally, steel in the present disclosure may contain Fe as a main component and may contain an inevitable impurity in addition to the elements above. Examples of the inevitable impurity include phosphorus (P), sulfur (S), nitrogen (N), oxygen (O), aluminum (Al), and the like. An amount of each of these inevitable impurity elements is 0.1 mass % or less.

From a different point of view, outer ring 11 and inner ring 13 may be made of a steel material representing an exemplary bearing material such as high-carbon chromium bearing steel defined under JIS and more specifically SUJ2 defined under JIS. Roller 12 may be made of a steel material representing an exemplary bearing material such as high-carbon chromium bearing steel defined under JIS and more specifically SUJ2 defined under JIS. Alternatively, roller 12 may be made of another material such as a sialon sintered material.

As shown in FIG. 2, nitrogen enriched layers 11B and 13B are formed in raceway surface 11A of outer ring 11 and raceway surface 13A of inner ring 13, respectively. In inner ring 13, nitrogen enriched layer 13B extends from raceway surface 13A to a smaller flange surface 19 and a larger flange surface 18. Nitrogen enriched layers 11B and 13B are regions higher in nitrogen concentration than an unnitrided portion 11C of outer ring 11 and an unnitrided portion 13C of inner ring 13. Smaller flange face 19 of inner ring 13 is finished to a ground surface in parallel to a smaller end face 17 of tapered roller 12 disposed on raceway surface 13A. Larger flange surface 18 of inner ring 13 is finished to a ground surface extending along a larger end face 16 of tapered roller 12. An undercut 25A is provided at a corner where inner-ring raceway surface 13A and larger flange surface 18 meet each other.

Nitrogen enriched layer 12B is formed in a surface of roller 12 including rolling surface 12A. Nitrogen enriched layer 12B may be formed in larger end face 16 of roller 12. Furthermore, nitrogen enriched layer 12B may be formed in smaller end face 17 of roller 12. Nitrogen enriched layer 12B of roller 12 is a region higher in nitrogen concentration than an unnitrided portion 12C of roller 12. Nitrogen enriched layers 11B, 12B, and 13B can be formed by any conventionally well-known method such as carbonitriding and nitriding.

Nitrogen enriched layer 12B may be formed only in roller 12, nitrogen enriched layer 11B may be formed only in outer ring 11, or nitrogen enriched layer 13B may be formed only in inner ring 13. Alternatively, a nitrogen enriched layer may be formed in two of outer ring 11, inner ring 13, and roller 12. At least any one of outer ring 11, inner ring 13, and roller 12 should only include a nitrogen enriched layer.

Thickness of Nitrogen Enriched Layer and Concentration of Nitrogen in Nitrogen Enriched Layer:

A thickness of each of nitrogen enriched layers 11B, 12B, and 13B may be 0.2 mm or more. Specifically, a distance from outer-ring raceway surface 11A as an outermost surface of a surface layer of outer ring 11 to a bottom of nitrogen enriched layer 11B may be not shorter than 0.2 mm. A distance from rolling surface 12A as a part of an outermost surface of a surface layer of tapered roller 12 to a bottom of nitrogen enriched layer 12B may be not shorter than 0.2 mm. A distance from larger end face 16 or smaller end face 17 as a part of the outermost surface of the surface layer of tapered roller 12 to the bottom of nitrogen enriched layer 12B may be not shorter than 0.2 mm. A distance from inner-ring raceway surface 13A as a part of an outermost surface of a surface layer of inner ring 13 to a bottom of nitrogen enriched layer 13B may be not shorter than 0.2 mm. A distance from larger flange surface 18 as a part of the outermost surface of the surface of inner ring 13 to the bottom of nitrogen enriched layer 13B may be not shorter than 0.2 mm.

A nitrogen concentration in nitrogen enriched layers 11B, 12B, and 13B at a position of depth of 0.05 mm from the outermost surface is not lower than 0.1 mass % in tapered roller bearing 10.

Ratio $R/R_{BASE}$ Between Radius of Curvature R of Larger End Face 16 of Tapered Roller 12 and Distance $R_{BASE}$ from Point O to Larger Flange Surface 18 of Inner Ring 13:

As shown in FIG. 19, apexes of cone angles of tapered roller 12 and raceway surfaces 11A and 13A of outer ring 11 and inner ring 13 meet at one point O on the centerline of tapered roller bearing 10. Ratio $R/R_{BASE}$ between radius of curvature (which is also called a set radius of curvature) R of larger end face 16 of tapered roller 12 and distance $R_{BASE}$ from point O to larger flange surface 18 of inner ring 13 is determined by a value of distance $R_{BASE}$. Specifically, in the present embodiment, when distance $R_{BASE}$ is not longer than 100 mm, a value of ratio $R/R_{BASE}$ between set radius of curvature R and distance $R_{BASE}$ is not smaller than 0.70 and not greater than 0.9. In the first modification of the present embodiment, when distance $R_{BASE}$ exceeds 100 mm and is not longer than 200 mm, the value of ratio $R/R_{BASE}$ may be not smaller than 0.75 and not greater than 0.85. In the second modification of the present embodiment, when distance $R_{BASE}$ exceeds 200 mm and is not longer than 300 mm, the value of ratio $R/R_{BASE}$ may be not smaller than 0.77 and not greater than 0.83.

Shape of Larger End Face 16 of Tapered Roller 12:

Ratio $R_{process}/R$ between actual radius of curvature $R_{process}$ and set radius of curvature R is not lower than 0.5, where $R_{process}$ represents an actual radius of curvature after grinding of larger end face 16 of tapered roller 12. Specific description will be provided below.

FIGS. 20 and 21 are schematic cross-sectional views along an axis of rolling of tapered roller 12 obtained when grinding is ideally performed. When grinding is ideally performed, obtained larger end face 16 of tapered roller 12 defines a part of a spherical surface around point O (see FIG. 19) which is the apex of the cone angle of tapered roller 12. As shown in FIGS. 20 and 21, when such grinding as leaving a part of a projection 16A is ideally performed, larger end face 16 of roller 12 including an end face of projection 16A defines a part of one spherical surface around the apex of the cone angle of roller 12. In this case, an inner circumferential end of projection 16A in a radial direction around the axis of rolling (axis of rotation) of roller 12 is connected to a recess 16B with points C2 and C3 being interposed. Projection 16A has an outer circumferential end connected to a chamfered portion 16C with points C1 and C4 being interposed. In the ideal larger end face, points C1 to C4 are arranged on one spherical surface as described above.

In general, a tapered roller is manufactured by successively subjecting a columnar machined component for a roller to forging and grinding including crowning. In a central portion of a surface to be a larger end face of a formed product obtained by forging, a recess resulting from a shape of a punch of a forging apparatus is provided. The recess has, for example, a circular two-dimensional shape. From a different point of view, a projection resulting from punching by the forging apparatus is formed in the outer circumferential portion of a surface to be the larger end face of the formed product obtained by forging. The projection has, for example, an annular two-dimensional shape. At least a part of the projection of the formed product is removed by subsequently performed grinding.

Radius of curvature (set radius of curvature) R of larger end face 16 of roller 12 refers to an R dimension when larger end face 16 of roller 12 shown in FIG. 20 is a set ideal spherical surface. Specifically, as shown in FIG. 21, points C1, C2, C3, and C4 at an end of larger end face 16 of roller 12, a point P5 intermediate between points C1 and C2, and a point P6 intermediate between points C3 and C4 are considered. When larger end face 16 is defined by the ideal spherical surface, in the cross-section shown in FIG. 21, larger end face 16 is defined by an ideal single arcuate curve that satisfies such a condition that a radius of curvature R152 which passes through points C1, P5, and C2, a radius of curvature R364 which passes through points C3, P6, and C4, and a radius of curvature R1564 which passes through points C1, P5, P6, and C4 satisfy relation of R152=R364=R1564. Points C1 and C4 are points of connection between projection 16A and chamfered portion 16C and points C2 and C3 are points of connection between projection 16A and recess 16B. A radius of curvature of the ideal single arcuate curve which satisfies relation of R=R152=R364=R1564 is called a set radius of curvature. Set radius of curvature R is different from actual radius of curvature $R_{process}$ measured as a radius of curvature of larger end face 16 of tapered roller 12 obtained by actual grinding as will be described later.

FIG. 22 is a schematic cross-sectional view along the axis of rolling of the tapered roller obtained by actual grinding. FIG. 22 shows the ideal larger end face shown in FIG. 21 with a dotted line. As shown in FIG. 22, larger end face 16 of tapered roller 12 actually obtained by grinding a formed product provided with the recess and the projection as above does not define a part of one spherical surface around an apex of a cone angle of tapered roller 12. Points C1 to C4 on the projection of actually obtained tapered roller 12 sag as compared with projection 16A shown in FIG. 21. As compared with points C1 and C4 shown in FIG. 21, points C1 and C4 shown in FIG. 22 are arranged on an outer circumferential side in the radial direction with respect to the center of the axis of rolling and arranged inside in a direction of extension of the axis of rolling (R152 on one side with respect to R1564 of the entire larger end face 16 being not identical but being small).

As compared with points C2 and C3 shown in FIG. 21, points C2 and C3 shown in FIG. 22 are arranged on an inner circumferential side in the radial direction with respect to the center of the axis of rolling and arranged on the inner side in the direction of extension of the axis of rolling (R364 on one side with respect to R1564 of the entire larger end face 16 not being identical but being small). Intermediate points P5 and P6 shown in FIG. 22 are formed at positions substantially equal to intermediate points P5 and P6 shown, for example, in FIG. 21.

As shown in FIG. 22, in the larger end face actually formed by grinding, apex C1 and apex C2 are arranged on one spherical surface and apex C3 and apex C4 are arranged on another spherical surface. In general grinding, a radius of curvature of one circular arc defined by a part of the larger end face formed on one projection is substantially equal to a radius of curvature of a circular arc defined by a part of the larger end face formed on the other projection. R152 on one side after working of larger end face 16 of roller 12 shown in FIG. 22 is substantially equal to R364 on the other side. R152 and R364 on one side after working of larger end face 16 of roller 12 are called actual radius of curvature $R_{process}$. Actual radius of curvature $R_{process}$ is not greater than set radius of curvature R.

Tapered roller 12 of the tapered roller bearing according to the present embodiment has ratio $R_{process}/R$ of actual radius of curvature $R_{process}$ to set radius of curvature R not lower than 0.5 as described above.

As shown in FIG. 22, in the larger end face actually formed by grinding, a radius of curvature $R_{virtual}$ (which is referred to as a virtual radius of curvature below) of a virtual circular arc which passes through apex C1, intermediate point P5, intermediate point P6, and apex C4 is not greater than set radius of curvature R. Tapered roller 12 of the tapered roller bearing according to the present embodiment has a ratio $R_{process}/R_{virtual}$ of actual radius of curvature $R_{process}$ to virtual radius of curvature $R_{virtual}$ not lower than 0.5.

Surface Roughness of Larger End Face 16 of Tapered Roller 12:

Arithmetic mean roughness (surface roughness) Ra of larger end face 16 may be not greater than 0.10 μm. Description will be given below with reference to FIG. 23. FIG. 23 is a schematic plan view showing larger end face 16 of tapered roller 12. As shown in FIG. 23, larger end face 16 includes chamfered portion 16C, projection 16A, and recess 16B. In larger end face 16, chamfered portion 16C is arranged around an outermost circumference. Annular projection 16A is arranged on the inner circumferential side of chamfered portion 16C. Recess 16B is arranged on the inner circumferential side of projection 16A. Projection 16A is a surface that projects relative to recess 16B. Chamfered portion 16C is formed to connect projection 16A to the rolling surface which is a side surface of tapered roller 12. Arithmetic mean roughness Ra of larger end face 16 described above substantially means surface roughness of projection 16A. In larger end face 16 of tapered roller 12, a difference between a maximum value and a minimum value of arithmetic mean roughness Ra of projection 16A which is an annular surface region in contact with larger flange surface 18 may be not greater than 0.02 μm.

Larger flange surface 18 is ground to surface roughness, for example, not greater than 0.12 μm Ra. Preferably, the larger flange surface has arithmetic mean roughness Ra not greater than 0.063 μm.

Figure 24:
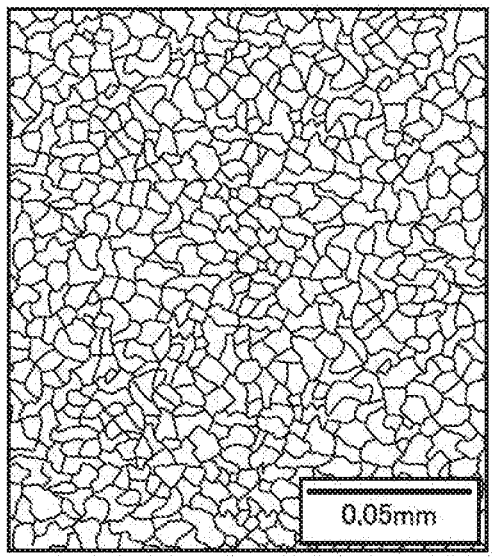
FIG. 24 illustrates a prior austenite crystal grain boundary of a bearing component according to the embodiment.
Figure 25:
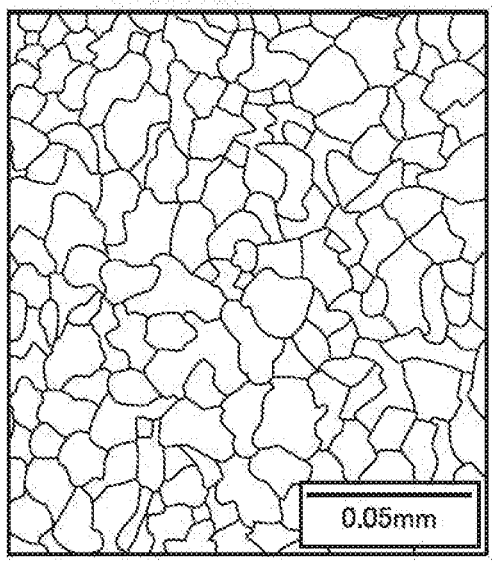
FIG. 25 illustrates a prior austenite crystal grain boundary of a conventional bearing component.

Crystal Structure of Nitrogen Enriched Layer:

A grain size number defined under JIS, of a prior austenite crystal grain size in nitrogen enriched layers 11B, 12B, and 13B is equal to or greater than 10. FIG. 24 is a schematic diagram illustrating a microstructure, in particular a prior austenite crystal grain boundary, of a bearing component constituting the tapered roller bearing according to the present embodiment. FIG. 25 is a schematic diagram illustrating a prior austenite crystal grain boundary of a conventional hardened bearing component. FIG. 24 shows a microstructure in nitrogen enriched layer 12B. A grain size number defined under the JIS, of a prior austenite crystal grain size in nitrogen enriched layer 12B in the present embodiment is equal to or greater than 10, and the grain size is sufficiently fine even in comparison with a prior austenite crystal grain size of a conventional general hardened product shown in FIG. 25.

Figure 26:
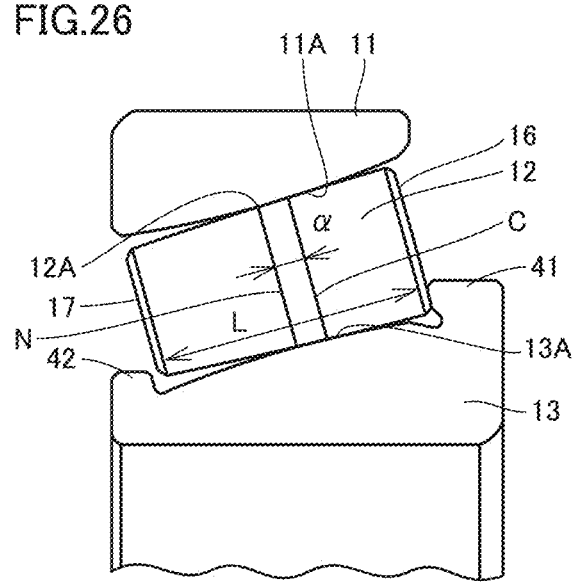
FIG. 26 is a schematic cross-sectional view showing an exemplary method of changing a position of abutment between an inner-ring raceway surface and a rolling surface in the tapered roller bearing according to the embodiment.

Position of Abutment Between Rolling Surface of Tapered Roller 12 and Inner-Ring Raceway Surface:

As shown in FIG. 26, in tapered roller bearing 10, a ratio α/L may be not lower than 0% and lower than 20% where L represents a width of rolling surface 12A in a direction of extension of the axis of rolling of tapered roller 12 and α represents an amount of displacement from a midpoint N of rolling surface 12A in the direction of extension, of a center C of a position of abutment between inner-ring raceway surface 13A and rolling surface 12A toward larger end face 16.

The present inventors have confirmed that, by setting ratio α/L to be not lower than 0% and lower than 20% and setting center C of the position of abutment when ratio α/L exceeds 0% to be located at center N of the rolling surface in the direction of extension of the axis of rolling or closer to larger end face 16 than center N, a skew angle can be decreased and increase in rotational torque can be suppressed as compared with an example in which center C of the position of abutment when ratio α/L exceeds 0% is located closer to smaller end face 17 than center N of the rolling surface in the direction of extension of the axis of rolling.

Table 1 shows a result of calculation of each ratio of a skew angle φ and rotational torque M with displacement amount α being varied to a skew angle φ0 and rotational torque M0 when displacement amount α is 0, that is, when center C of the position of abutment between inner-ring raceway surface 13A and outer-ring raceway surface 13A, and rolling surface 12A of tapered roller 12 is located at center N of rolling surface 12A in the direction of extension of the axis of rolling. Table 1 shows displacement amount α as a ratio (α/L) of displacement amount α to width L of rolling surface 12A of roller 12. Table 1 shows with a negative value, a displacement amount when the position of abutment is displaced toward smaller end face 17 relative to center N. Values of skew angle φ0 and torque M0 are those at the time when displacement amount α is 0.

TABLE 1

| Ratio α/L (%) | −10 | −5 | 0 | 5 | 10 | 15 | 20 |
|---|---|---|---|---|---|---|---|
| Skew Angle Ratio φ/φ0 | 2 | 1.5 | 1 | 0.75 | 0.5 | 0.4 | 0.3 |
| Rotational Torque Ratio M/M0 | 1.2 | 1.1 | 1 | 1.03 | 1.05 | 1.1 | 1.2 |
| Determination | NG | NG | OK | OK | OK | OK | NG |

As shown in Table 1, it can be seen that skew angle φ is smaller when abutment occurs on a larger diameter side than when ratio α/L in connection with displacement amount α is 0%. Though rotational torque M increases with increase in displacement amount α, influence thereby is greater when abutment occurs on a smaller diameter side than when abutment occurs on the larger diameter side. Since the skew angle is 1.5 time larger when ratio α/L in connection with displacement amount α is −5%, influence on heat generation is unignorable and such a case is determined as not being suitable for practical use (NG). When α/L is equal to or higher than 20%, sliding at rolling surface 12A of roller 12 is greater and rotational torque M increases, which leads to another disadvantage such as peeling. Therefore, such a case is determined as not being suitable for practical use (NG).

In view of results above, in order to decrease skew angle φ and rotational torque M, ratio α/L in connection with displacement amount α is desirably not lower than 0% and lower than 20%. Preferably, ratio α/L exceeds 0%. Furthermore, ratio α/L may exceed 0% and be lower than 15%.

Figure 27:
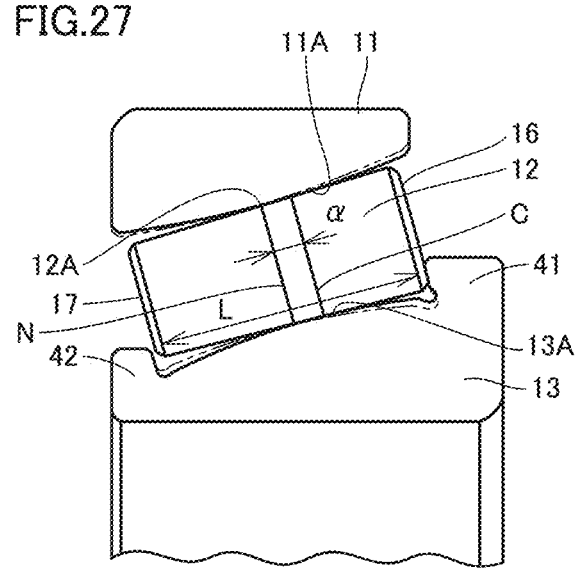
FIG. 27 is a cross-sectional view showing another exemplary method of changing a position of abutment between a rolling contact surface and a rolling surface in the tapered roller bearing according to the embodiment.

A construction where ratio α/L exceeds 0% is shown, for example, in FIGS. 26 and 27. FIGS. 26 and 27 are schematic cross-sectional views showing exemplary methods of changing a position of abutment between inner-ring raceway surface 13A and rolling surface 12A in the tapered roller bearing.

As shown in FIG. 26, the construction can be achieved by relatively displacing a position of an apex of each of the crowning profile formed in rolling surface 12A of roller 12 and the crowning profile formed in inner-ring raceway surface 13A and outer-ring raceway surface 11A.

The construction where ratio α/L exceeds 0% can be achieved by relatively changing an angle formed by inner-ring raceway surface 13A with respect to the axial direction of the inner ring and an angle formed by outer-ring raceway surface 11A with respect to the axial direction of outer ring 11 as shown in FIG. 27. Specifically, the construction where ratio α/L exceeds 0% can be achieved by at least any method of making the angle formed by inner-ring raceway surface 13A with respect to the axial direction of inner ring 13 greater and making the angle formed by outer-ring raceway surface 11A with respect to the axial direction of outer ring 11 smaller than in an example where displacement amount α of the position of abutment shown with the dotted line in FIG. 27 is zero.

Figure 28:
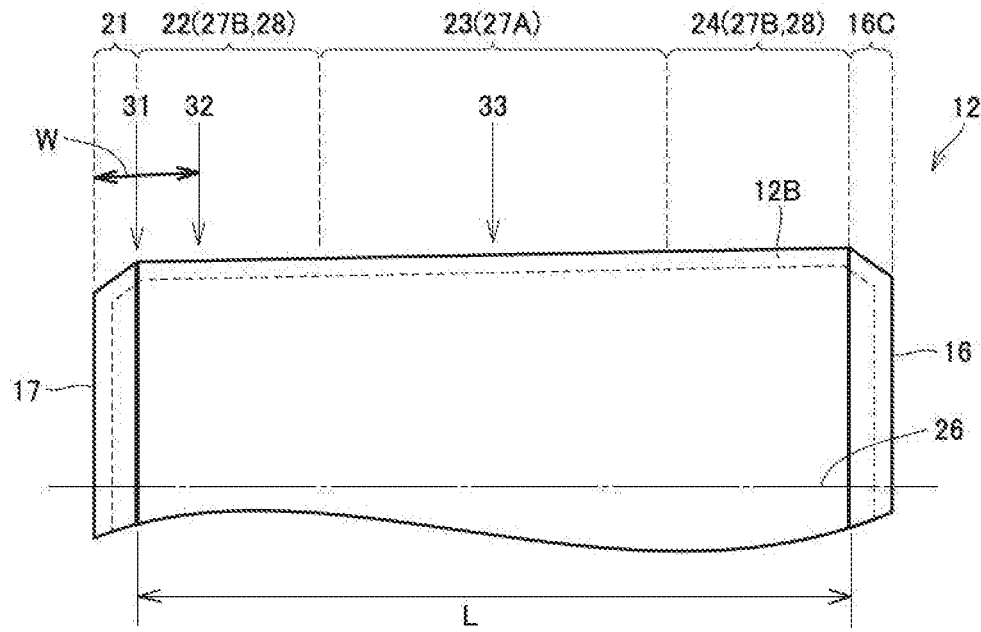
FIG. 28 is a diagram for illustrating a shape of the nitrogen enriched layer in a crowned portion and a central portion of a roller of the tapered roller bearing according to the embodiment.

Shape of Rolling Surface of Tapered Roller 12:

As shown in FIG. 28, rolling surface 12A (see FIG. 2) of roller 12 includes crowned portions 22 and 24 located at opposing ends and a central portion 23 connecting crowned portions 22 and 24 to each other. Central portion 23 is uncrowned and linear in a cross section in a direction along a centerline 26 representing the rotation axis of roller 12. A chamfered portion 21 is formed between smaller end face 17 of roller 12 and crowned portion 22. Chamfered portion 16C is also formed between larger end face 16 of roller 12 and crowned portion 24.

Figure 29:
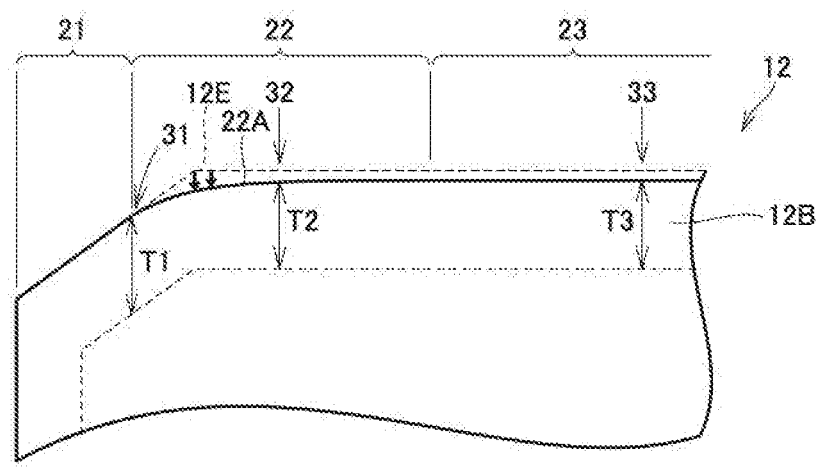
FIG. 29 is a diagram for illustrating a shape of a logarithmic crowning profile of the roller of the tapered roller bearing according to the embodiment.

In a method of manufacturing roller 12, in treatment for forming nitrogen enriched layer 12B (carbonitriding treatment), roller 12 is not crowned but an outer geometry of roller 12 is a yet-to-be-worked surface 12E shown with a dotted line in FIG. 13. After the nitrogen enriched layer is formed in this state, roller 12 has a side surface worked as shown with an arrow in FIG. 29 as finishing so that crowned portions 22 and 24 are obtained as shown in FIGS. 28 and 29.

Specific Example of Thickness of Nitrogen Enriched Layer:

A depth of nitrogen enriched layer 12B in roller 12, that is, a distance from the outermost surface of nitrogen enriched layer 12B to the bottom of nitrogen enriched layer 12B, is 0.2 mm or more as described above. Specifically, at a first measurement point 31 representing a boundary point between chamfered portion 21 and crowned portion 22, a second measurement point 32 at a distance W of 1.5 mm from smaller end face 17, and a third measurement point 33 at the center of rolling surface 12A of roller 12, depths T1, T2, and T3 of nitrogen enriched layer 12B at these positions are 0.2 mm or more. The depth of nitrogen enriched layer 12B means a thickness of nitrogen enriched layer 12B in a radial direction orthogonal to centerline 26 of roller 12 and toward the outer circumference. Values of depths T1, T2, and T3 of nitrogen enriched layer 12B can be modified as appropriate, depending on a shape and a size of chamfered portions 21 and 16C and a process condition such as a condition for treatment to form nitrogen enriched layer 12B and a condition for finishing. For example, in the exemplary construction shown in FIG. 29, depth T2 of nitrogen enriched layer 12B is smaller than other depths T1 and T3 due to formation of a crowning profile 22A after formation of nitrogen enriched layer 12B as described above. By changing the process condition described above, however, relation in magnitude among the values of depths T1, T2, and T3 of nitrogen enriched layer 12B can be modified as appropriate.

A thickness of nitrogen enriched layers 11B and 13B in outer ring 11 and inner ring 13 representing a distance from the outermost surface to the bottom thereof is again not smaller than 0.2 mm as described above. The thickness of nitrogen enriched layers 11B and 13B means a distance to nitrogen enriched layers 11B and 13B in a direction perpendicular to the outermost surface of nitrogen enriched layers 11B and 13B.

Crowning Profile:

A crowning profile formed in a contact area crowned portion 27 included in crowned portions 22 and 24 of roller 12 (which is a portion continuous to central portion 23 and in contact with inner-ring raceway surface 13A) is defined as below.

Specifically, a sum of crown drops is expressed in a y-z coordinate system with a generatrix of rolling surface 12A of roller 12 being defined as the y axis and a direction orthogonal to the generatrix being defined as the z axis by an expression (1) below where K1, K2, and zm represent design parameters, Q represents a load, L represents a length of an effective contact portion of rolling surface 12A of roller 12 along the generatrix, E' represents an equivalent elastic modulus, a represents a length from an origin on the generatrix of the rolling surface of roller 12 to an end of the effective contact portion, and A is defined as A=2K1Q/πLE'.

[Expression 1]

$$z(y) = A \ln \frac{1}{1 - \left\{1 - \exp\left(-\frac{z_m}{A}\right)\right\}\left(\frac{y-a}{K_2 a} + 1\right)^2} \quad (1)$$

Figure 30:
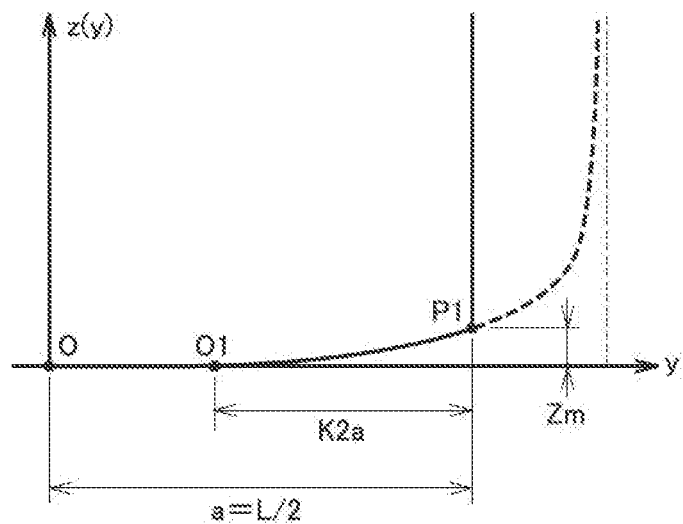
FIG. 30 is a y-z coordinate diagram showing an exemplary crowning profile.

FIG. 30 is a y-z coordinate diagram showing an exemplary crowning profile. FIG. 30 shows an exemplary crowning profile expressed in the expression (1) in the y-z coordinate system with the generatrix of roller 12 being defined as the y axis, origin O being taken on the generatrix of roller 12 at the central portion of the effective contact portion between inner ring 13 or outer ring 11 and roller 12, and a direction orthogonal to the generatrix (a direction of radius) being defined as the z axis. In FIG. 30, the ordinate represents the z axis and the abscissa represents the y axis. The effective contact portion refers to a portion of contact between inner ring 13 or outer ring 11 and roller 12 when roller 12 is uncrowned. Since the plurality of rollers 12 constituting tapered roller bearing 10 are crowned normally in line symmetry with respect to the z axis passing through the central portion of the effective contact portion, FIG. 30 only shows one crowning profile 22A (see FIG. 29).

Load Q, length L of the effective contact portion along the generatrix, and equivalent elastic modulus E' are given as design conditions, and length a from the origin to the end of the effective contact portion has a value determined by a position of the origin.

In the above expression (1), z(y) represents drop of crowning profile 22A at a position y in the direction of the generatrix of roller 12, and a coordinate of a starting point O1 of crowning profile 22A is expressed as (a−K2a, 0). Therefore, in the expression (1), y has a range of y>(a−K2a). In FIG. 14, since origin O is defined at the central portion of the effective contact portion, relation of a=L/2 is satisfied. A region from origin O to starting point O1 of crowning profile 22A is the uncrowned central portion (a straight portion). Therefore, when relation of 0≤y≤(a−K2a) is satisfied, relation of z(y)=0 is satisfied.

Design parameter K1 means a multiplying factor for load Q and geometrically means a degree of curvature of crowning profile 22A. Design parameter K2 means a ratio of a length ym of crowning profile 22A along the generatrix to length a from origin O to the end of the effective contact portion along the generatrix (K2=ym/a). Design parameter zm means drop at the end of the effective contact portion, that is, maximum drop of crowning profile 22A.

A full crowning profile without a straight portion defined by design parameter K2=1 is considered as a crowning profile of roller 12. In this case, sufficient drop which does not cause edge loading is ensured. Excessive drop, however, leads to large machining allowance taken from a raw material as a material to be worked, which will invite increase in cost. Accordingly, design parameters K1, K2, and zm are optimized as below.

Design parameters K1, K2, and zm can be optimized by various methods, and for example, a direct search method such as the Rosenbrock method can be adopted. Since surface-originating damage in a rolling surface of a roller depends on a contact pressure, by setting the contact pressure as an objective function for optimization, a crowning profile that prevents oil film breakage at a contact surface under lean lubrication can be obtained.

When roller 12 is provided with a logarithmic crowning profile, a straight portion (central portion 23) having a length at least ½ the entire length is preferably provided in a central portion of rolling surface 12A in order to secure working accuracy of the roller. In this case, K2 is set to a constant value and K1 and zm should only be optimized.

The profile of crowned portions 22 and 24 of tapered roller 12 is a logarithmic curve crowning profile calculated in accordance with the expression above. Limitation to the expression above, however, is not intended, and a logarithmic curve may be calculated by using another logarithmic crowning profile expression.

Figure 31:
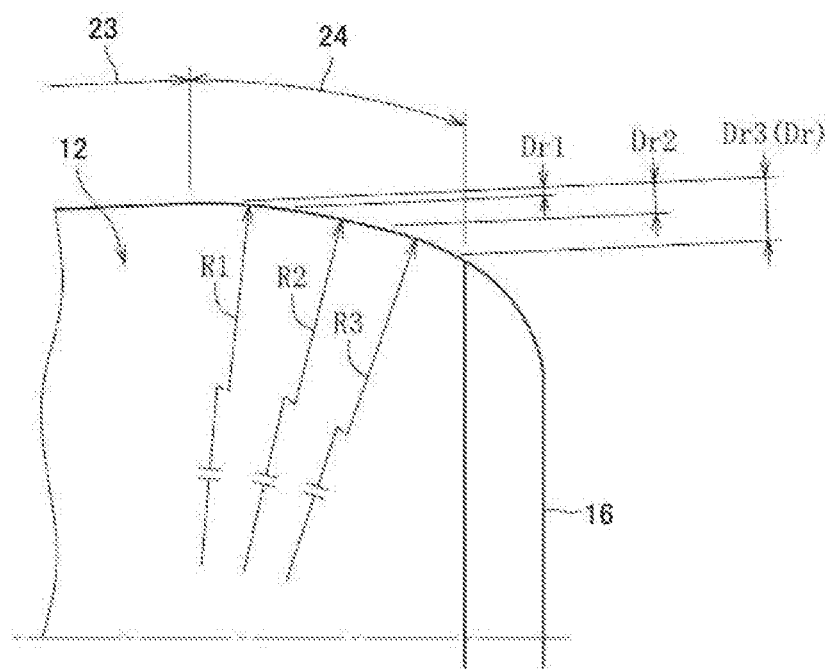
FIG. 31 is a diagram for illustrating an exemplary crowning profile of a roller of the tapered roller bearing according to the embodiment.

FIG. 31 is a diagram for illustrating an exemplary crowning profile of tapered roller 12. Crowned portions 22 and 24 of tapered roller 12 shown in FIG. 28 may be provided with a crowning profile in a shape approximate to a logarithmic curve of a logarithmic crowning profile calculated in the expression above. Details of crowned portion 24 provided on the side of larger end face 16 of tapered roller 12 will be described with reference to FIG. 31. FIG. 31 shows drop as being more exaggerated than drop of tapered roller 12 shown in FIG. 29 for better understanding of drop of crowned portion 24. Crowned portion 24 is formed in such a composite arcuate shape that three arcs having large radii of curvature R1, R2, and R3 in straight portion 23 are smoothly connected. By defining drop Dr1 of a first gate, drop Dr2 of an intermediate second gate, and drop Dr3 of a largest third gate as drop of crowned portion 24, a crowning profile approximate to the logarithmic curve is obtained. Drop Dr3 corresponds to zm in the expression (1) described previously. An edge contact pressure can thus be avoided and distribution of the contact pressure in the axial direction can be made uniform. Though drop Dr is different depending on a size or a model, it is approximately 50 μm at the maximum. Since crowned portion 22 formed on the side of smaller end face 17 is similar in shape to crowned portion 24, description thereof will not be repeated. Central portion 23 of the rolling surface of tapered roller 12 having a linear shape herein means that the shape includes not only the linear shape but also a substantially linear shape with a crowning profile having drop of approximately several μm being provided.

Figure 34:
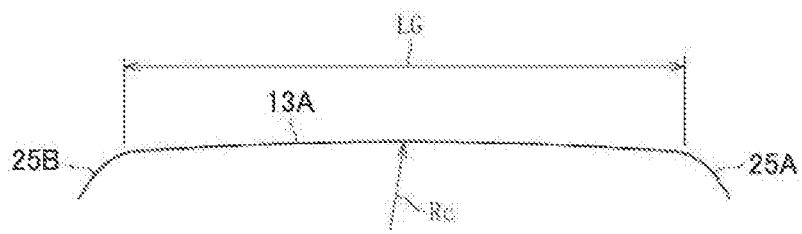
FIG. 34 is a schematic diagram showing a shape in a direction of a generatrix, of the inner-ring raceway surface shown in FIG. 32.

Shape of Inner-Ring Raceway Surface and Outer-Ring Raceway Surface:

A shape of inner-ring raceway surface 13A in the direction of the generatrix will now be described with reference to FIGS. 32 to 34. FIG. 32 is a partial schematic cross-sectional view showing a detailed shape of inner ring 13. FIG. 33 is an enlarged schematic diagram of a region XXXIII in FIG. 32. FIG. 34 is a schematic diagram showing a shape in the direction of the generatrix, of inner-ring raceway surface 13A shown in FIG. 32. FIGS. 32 and 33 show a partial contour of tapered roller 12 on a side of larger end face 16 with a chain double-dotted line.

As shown in FIGS. 32 to 34, inner-ring raceway surface 13A is formed to have a full crowning profile of a single gently circular arc and connected to undercuts 25A and 25B. A radius of curvature Rc of the full crowning profile of the single gently circular arc is extremely large to such an extent as causing drop, for example, of approximately 5 μm at opposing ends of inner-ring raceway surface 13A. As shown in FIG. 32, since undercuts 25A and 25B are provided in inner-ring raceway surface 13A, an effective raceway surface width LG of inner-ring raceway surface 13A is set.

As shown in FIG. 33, a flank 18A smoothly connected to larger flange surface 18 is formed on a radially outer side of larger flange surface 18. A gap in a wedge shape provided between flank 18A and larger end face 16 of tapered roller 12 can enhance a function to draw in lubricating oil and form a sufficient oil film. Though the full crowning profile of the single gently circular arc is exemplified as the shape of inner-ring raceway surface 13A in the direction of the generatrix, the shape thereof may be straight without being limited as such.

Though the shape of inner-ring raceway surface 13A of inner ring 13 in the direction of the generatrix has been described above, the shape of outer-ring raceway surface 11A in the direction of the generatrix is also similar and hence description will not be repeated.

A result of verification will now be described, from which the present embodiment is derived where rolling surface 12A of tapered roller 12 has a logarithmic crowning profile (central portion 23 being straight) and inner-ring raceway surface 13A and outer-ring raceway surface 11A have a straight shape or a full crowning profile of a single gently circular arc.

A contact surface pressure of outer-ring raceway surface 11A and a ratio of a contact ellipse to effective rolling surface width L (see FIG. 28) of rolling surface 12A of tapered roller 12 under a low-speed condition (a first speed) with misalignment and a high-speed condition (a fourth speed) without misalignment, of a tapered roller bearing (having an inner diameter of ϕ35 mm, an outer diameter of ϕ62 mm, and a width of 18 mm) for a transmission of an automobile were verified. Table 2 shows samples used for verification.

TABLE 2

| Sample 1 | Sample 2 |
|---|---|
| Based on the present embodiment | Tapered roller: Having full crowning profile |
| Tapered roller: Having logarithmic crowning profile (the central portion being straight and drop at opposing ends of the rolling surface being as large as approximately from 20 to 30 μm) | (drop at opposing ends of the rolling surface being as small as approximately 3 μm) Inner ring: Having cut crowning profile (the central portion being straight and drop at opposing ends of the inner-ring raceway |

TABLE 2-continued

| Sample 1 | Sample 2 |
|---|---|
| Inner ring and outer ring: Being straight or having full crowning profile (drop being small around 5 μm) | surface being as large as approximately 15 μm) Outer ring: Having full crowning profile (drop at opposing ends of the outer-ring raceway surface being as large as approximately 20 μm) |

Table 3 shows results of verification.

TABLE 3

| Verification Condition | Sample | Contact Pressure at Outer-Ring Raceway Surface (MPa) | | Contact Ellipse (Radius of Major Axis)/Roller Effective Rolling Surface Width LW (%) | Determination |
|---|---|---|---|---|---|
| | | $P_{MAX}$ | $P_{EDGE}$ | | |
| Without Misalignment (High-Speed Condition) | Sample 1 | 2000 | None | 75 | OK |
| | Sample 2 | 1500 | None | 55 | NG |
| With Misalignment (Low-Speed Condition) | Sample 1 | 3000 | None | 78 | OK |
| | Sample 2 | 2500 | Yes | 100 | NG |

Under the high-speed condition without misalignment, a load condition was relatively light. Therefore, as shown in Table 3, no edge contact pressure ($P_{EDGE}$) was produced in samples 1 and 2. In sample 2, drop of full crowning of the outer ring was large and the contact ellipse (a radius of a major axis) was short. Therefore, variation in center C of the position of abutment was greater and skew of the tapered roller was more likely to be induced than in an example where an area of contact was long, and hence sample 2 was determined as not being suitable for practical use (NG).

Under the low-speed condition with misalignment, high load was applied. Therefore, in sample 2, a ratio of the contact ellipse to roller effective rolling surface width L was 100% and the edge contact pressure was produced in the outer ring. Furthermore, edge contact occurred, which led to drive in a state of contact on the side of the smaller end face of the tapered roller. Therefore, large skew was induced and sample 2 was determined as not being suitable for practical use (NG).

As set forth above, it was verified that full crowning large in drop was preferably not provided in the outer ring for suppressing skew, and significance of sample 1 could be confirmed.

<Method of Measuring Various Characteristics>
Method of Measuring Nitrogen Concentration:

Bearing components such as outer ring 11, roller 12, and inner ring 13 are subjected to line analysis in a direction of depth by Electron Probe Micro Analysis (EPMA) in cross-sections perpendicular to surfaces of regions where nitrogen enriched layers 11B, 12B, and 13B are formed. Measurement is conducted by cutting each bearing component from a measurement position in a direction perpendicular to the surface to expose a cut surface and subjecting the surface to measurement. For example, roller 12 is cut from each of first measurement point 31 to third measurement point 33 shown in FIG. 28 in a direction perpendicular to centerline 26 to expose a cut surface. The cut surface is analyzed for a nitrogen concentration by EPMA at a plurality of measurement positions each located at a distance of 0.05 mm inward from the surface of roller 12. For example, five measurement positions are determined, and an average value of measurement data obtained at the five locations is adopted as a nitrogen concentration of roller 12.

For outer ring 11 and inner ring 13, for example, a central portion of raceway surfaces 11A and 13A in the direction of the central axis of the bearing is set as a measurement position and a cross-section along the central axis and a radial direction orthogonal to the central axis is exposed, and the cross-section is thereafter subjected to nitrogen concentration measurement in the same manner as described above.

Method of Measuring Distance from Outermost Surface to Bottom of Nitrogen Enriched Layer:

Outer ring 11 and inner ring 13 are subjected to hardness distribution measurement in a direction of depth from a surface in the cross-section subjected to measurement in the method of measuring a nitrogen concentration. A Vickers hardness measurement instrument can be employed as a measurement apparatus. Tapered roller bearing 10 tempered at a heating temperature of 500° C.×a heating time period of 1 h is subjected to hardness measurement at a plurality of measurement points aligned in the direction of depth such as measurement points arranged at intervals of 0.5 mm. A region having a Vickers hardness of HV 450 or more is determined as a nitrogen enriched layer.

Roller 12 is subjected to hardness distribution measurement in the direction of depth as described above in a cross-section at first measurement point 31 shown in FIG. 28, to determine the region of the nitrogen enriched layer.

Method of Measuring Grain Size Number:

A prior austenite crystal grain size is measured by a method defined under JIS G0551: 2013. Measurement is conducted in the cross-section subjected to measurement in the method of measuring a distance to the bottom of the nitrogen enriched layer.

Method of Measuring Crowning Profile:

A crowning profile of roller 12 can be measured by any method. For example, the crowning profile may be measured by measuring a profile of roller 12 with a surface texture measurement instrument.

Method of Measuring Radius of Curvature of Larger End Face of Roller:

Actual radius of curvature $R_{process}$ and virtual radius of curvature $R_{virtual}$ at larger end face 16 of tapered roller 12 shown in FIG. 22 actually formed by grinding can be measured by any method, and can be measured, for example, by using a surface roughness measurement instrument (for example, Surface Roughness Tester Surftest SV-3100 manufactured by Mitutoyo Corporation). When the surface roughness measurement instrument is used, an axis of measurement is initially set along the radial direction around the axis of rolling and a surface texture of the larger end face (the shape in the direction of the generatrix) is determined. Apexes C1 to C4 and intermediate points P5 and P6 are plotted on the obtained profile of the larger end face. Actual radius of curvature $R_{process}$ is calculated as a radius of curvature of a circular arc which passes through plotted apex C1, intermediate point P5, and apex C2. Virtual radius of curvature $R_{virtual}$ is calculated as a radius of curvature of a circular arc which passes through plotted apex C1, intermediate points P5 and P6, and apex C4. Alternatively, virtual radius of curvature $R_{virtual}$ of the entire larger end face 16 may be determined by calculating a radius of an approximated arcuate curve based on values at four points taken by using a command "input a plurality of times". The shape of larger end face 16 in the direction of the generatrix is measured once in a direction of the diameter.

Set radius of curvature R is estimated from each dimension of the tapered roller obtained by actual grinding, for example, based on such an industrial standard as JIS.

Method of Measuring Surface Roughness:

Arithmetic mean roughness Ra of larger end face 16 of roller 12 can be measured by any method, and can be measured, for example, by using a surface roughness measurement instrument (for example, Surface Roughness Tester Surftest SV-3100 manufactured by Mitutoyo Corporation). Arithmetic mean roughness Ra of the larger end face can be measured, for example, by a method of bringing a stylus of the measurement instrument into contact with larger end face 16 of roller 12. In larger end face 16, a difference between a maximum value and a minimum value of arithmetic mean roughness Ra of projection 16A which is an annular surface region in contact with the larger flange surface can be found by measuring arithmetic mean roughness Ra by using the surface roughness measurement instrument at any four locations in projection 16A and calculating a difference between the maximum value and the minimum value of the surface roughness at the four locations.

<Function and Effect of Tapered Roller Bearing>

The present inventors have paid attention to matters below on the tapered roller bearing and derived the construction of the tapered roller bearing described above.

(1) A ratio between a set radius of curvature and an actual radius of curvature after working, of the larger end face of the tapered roller (2) A shape of the raceway surface of the inner ring and the outer ring for suppressing skew of the tapered roller (3) Application of the logarithmic crowning profile to the rolling surface of the tapered roller (4) Application of the nitrogen enriched layer to the tapered roller, the inner ring, and the outer ring (5) Supply of lubricating oil to the larger flange surface of the inner ring by using the oil retaining hole Characteristic features of the above-described tapered roller bearing will be listed below, although description may partially be redundant.

Tapered roller bearing 10 according to the present disclosure includes outer ring 11, inner ring 13, and a plurality of tapered rollers 12. Outer ring 11 includes outer-ring raceway surface 11A around the inner circumferential surface thereof. Inner ring 13 includes inner-ring raceway surface 13A around the outer circumferential surface thereof and larger flange surface 18 arranged on the larger diameter side relative to inner-ring raceway surface 13A, and is arranged on the inner side relative to outer ring 11. The plurality of tapered rollers 12 each include rolling surface 12A in contact with outer-ring raceway surface 11A and inner-ring raceway surface 13A and larger end face 16 in contact with larger flange surface 18. The plurality of tapered rollers 12 are disposed between outer-ring raceway surface 11A and inner-ring raceway surface 13A.

Cage 14 includes a plurality of pockets 109 arranged at a prescribed interval in the circumferential direction. Cage 14 accommodates and holds the plurality of tapered rollers 12 in respective ones of the plurality of pockets 109. Cage 14 includes smaller annular portion 106, larger annular portion 107, and a plurality of posts 108. Smaller annular portion 106 is continuous on the smaller diameter side of the plurality of tapered rollers 12. Larger annular portion 107 is continuous on the larger diameter side of the plurality of tapered rollers 12. The plurality of posts 108 couple smaller annular portion 106 and larger annular portion 107 to each other. Smaller annular portion 106, larger annular portion 107, and the plurality of posts 108 serve as partitions among the plurality of pockets 109. Larger annular portion 107 is provided with oil retaining hole 14A, 14B, or 14C. Oil retaining hole 14A, 14B, or 14C includes an opening that faces pocket 109 and holds lubricating oil. A plurality of each of oil retaining holes 14A, 14B, and 14C may be formed as facing one pocket 109.

At least any one of outer ring 11, inner ring 13, and the plurality of tapered rollers 12 includes nitrogen enriched layer 11B, 12B, or 13B formed on a surface layer of outer-ring raceway surface 11A, inner-ring raceway surface 13A, or rolling surface 12A. A distance from the outermost surface of the surface layer to the bottom of nitrogen enriched layer 11B, 12B, or 13B is equal to or larger than 0.2 mm. A concentration of nitrogen in nitrogen enriched layer 11B, 12B, or 13B at a position of depth of 0.05 mm from the outermost surface may be not lower than 0.1 mass %. In larger end face 16 of tapered roller 12, a difference between a maximum value and a minimum value of arithmetic mean roughness Ra of an annular surface region (projection 16A) in contact with larger flange surface 18 may be not greater than 0.02 μm.

A value of ratio $R/R_{BASE}$ between set radius of curvature R and distance $R_{BASE}$ is not smaller than 0.75 and not greater than 0.87, where R represents a set radius of curvature of larger end face 16 of tapered roller 12 and $R_{BASE}$ represents a distance from point O (see FIG. 19) which is an apex of a cone angle of tapered roller 12 to larger flange surface 18 of inner ring 13. Ratio $R_{process}/R$ between actual radius of curvature $R_{process}$ and set radius of curvature R is not lower than 0.5, where $R_{process}$ represents an actual radius of curvature after grinding of larger end face 16 of tapered roller 12 as shown in FIG. 22.

By setting a value of ratio $R/R_{BASE}$ between set radius of curvature R and distance $R_{BASE}$ as described above, a sufficient oil film thickness can be ensured in the portion of contact between larger end face 16 of tapered roller 12 and larger flange surface 18 of inner ring 13 to suppress contact between tapered roller 12 and larger flange surface 18 and occurrence of wear and suppress heat generation in the portion of contact.

Figure 35:
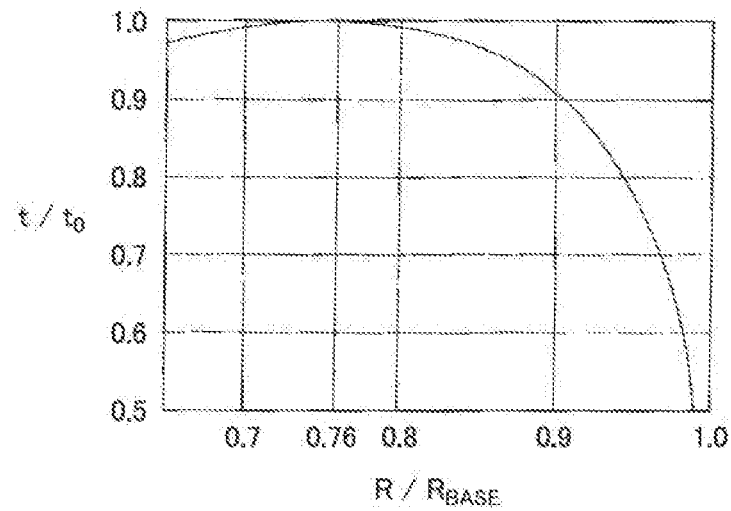
FIG. 35 shows a graph showing relation between a radius of curvature of a larger end face of the roller of the tapered roller bearing according to the embodiment and a thickness of an oil film.

The value of ratio $R/R_{BASE}$ is determined with reference to finding below. FIG. 35 shows a result of calculation by using the Karna expression, of a thickness t of the oil film formed between larger flange surface 18 of inner ring 13 and larger end face 16 of tapered roller 12. The ordinate represents a ratio t/t0 of thickness t of the oil film to a thickness t0 of the oil film when a condition of $R/R_{BASE}$=0.76 is satisfied. Thickness t of the oil film is maximal when a condition of $R/R_{BASE}$=0.76 is satisfied and abruptly decreases as $R/R_{BASE}$ exceeds 0.87.

Figure 36:
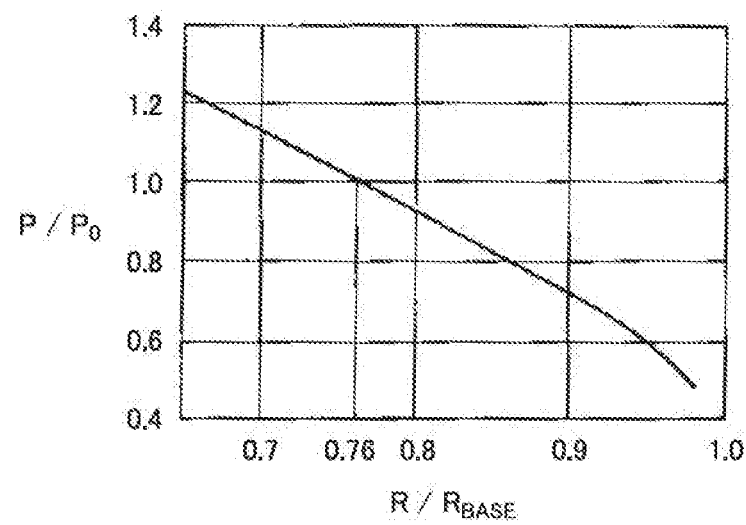
FIG. 36 shows a graph showing relation between a radius of curvature of the larger end face of the roller of the tapered roller bearing according to the embodiment and maximum Hertz stress.

FIG. 36 shows a result of calculation of maximum Hertz stress P between larger flange surface 18 of inner ring 13 and larger end face 16 of tapered roller 12. The ordinate represents a ratio P/P0 to maximum Hertz stress P0 at the time when a condition of $R/R_{BASE}$=0.76 is satisfied as in FIG. 35. Maximum Hertz stress P monotonously decreases with increase in $R/R_{BASE}$. In order to lessen torque loss and heat generation due to sliding friction between larger flange surface 18 of inner ring 13 and larger end face 16 of tapered roller 12, desirably, thickness t of the oil film is made larger and maximum Hertz stress P is made smaller. The present inventors have determined a condition for ratio $R/R_{BASE}$ with reference to the results of calculation in FIGS. 35 and 36 and in consideration of results of seizure resistance tests and a tolerance range in manufacturing.

Since nitrogen enriched layer 11B, 12B, or 13B is formed in at least any one of outer ring 11, inner ring 13, and roller 12 as the tapered roller, tapered roller bearing 10 that achieves improved rolling fatigue life, long lifetime, and high durability is obtained. Since resistance against softening by tempering is improved by formation of nitrogen enriched layers 11B, 12B, and 13B, high seizure resistance can be exhibited even though a temperature of the portion of contact between larger end face 16 and larger flange surface 18 is increased due to sliding contact. Nitrogen enriched layers 12B and 13B may be formed in both of larger end face 16 and larger flange surface 18. Nitrogen enriched layer 12B may be formed in the annular surface region (projection 16A) in larger end face 16.

In tapered roller bearing 10, oil retaining hole 14A may have the bottom located inside larger annular portion 107 as shown in FIGS. 1 and 2. From a different point of view, oil retaining hole 14A is constructed not to penetrate larger annular portion 107. In this case, as larger annular portion 107 is provided with oil retaining hole 14A, oil retaining hole 14A can hold lubricating oil therein. Therefore, lubricating oil can be supplied to a gap between larger end face 16 of tapered roller 12 and larger flange surface 18 of inner ring 13. Since oil retaining hole 14A does not penetrate larger annular portion 107, lowering in strength of larger annular portion 107 of cage 14 can be suppressed.

In tapered roller bearing 10, as shown in FIG. 10, oil retaining hole 14B may penetrate larger annular portion 107 so as to reach the surface of larger annular portion 107 located opposite to pocket 109. In this case, since oil retaining hole 14B is a through hole, lubricating oil can readily be introduced into oil retaining hole 14B. A width in the radial direction of oil retaining hole 14B preferably gradually increases from the surface of larger annular portion 107 opposite to pocket 109 toward pocket 109. In this case, lubricating oil held in oil retaining hole 14B can readily be supplied toward pocket 109 when rotation of tapered roller bearing 10 is started.

In tapered roller bearing 10, as shown in FIG. 14, larger annular portion 107 may include pocket-side surface portion 107A that faces pocket 109 and inner-ring-side surface portion 107B that is continuous to pocket-side surface portion 107A and faces inner ring 13. The opening of oil retaining hole 14C may be provided to extend from pocket-side surface portion 107A to inner-ring-side surface portion 107B. In this case, oil retaining hole 14C includes the opening that faces both of larger end face 16 of tapered roller 12 and larger flange portion 41 of inner ring 13. Therefore, lubricating oil can reliably be supplied from oil retaining hole 14C to the portion of contact between larger end face 16 of tapered roller 12 and larger flange portion 41 of inner ring 13.

In tapered roller bearing 10, the plurality of posts 108 may be provided with oil groove 108A in the side surface that faces pocket 109. In this case, lubricating oil can be held also in oil groove 108A while tapered roller bearing 10 remains stopped. Therefore, an amount of lubricating oil that can be supplied to tapered roller 12 at the time of start of rotation of tapered roller bearing 10 can be increased. Furthermore, lubricating oil can be supplied to larger flange surface 18 of inner ring 13 through oil groove 108A when tapered roller bearing 10 is operated. Consequently, seizure resistance of tapered roller bearing 10 can be improved. With the construction described above, tapered roller bearing 10 can obtain such a synergistic effect as improvement in seizure resistance immediately after start of rotation and during rotation.

In tapered roller bearing 10, a portion of connection between the plurality of posts 108 and smaller annular portion 106 may be provided with notch 106C. A width of pocket 109 in the circumferential direction on the side of smaller annular portion 106 may be smaller than the width of pocket 109 in the circumferential direction on the side of larger annular portion 107. By providing such notch 106C, lubricating oil that flows from the inner-diameter side of cage 14 toward inner ring 13 can quickly be transferred toward outer ring 11. Consequently, an amount of lubricating oil that stays in the inside of tapered roller bearing 10 can be decreased. Consequently, torque loss due to flow resistance of lubricating oil can be reduced.

In tapered roller bearing 10, distance LS between the inner-circumferential-side end face of smaller annular portion 106 of cage 14 and inner ring 13 may be not larger than 1.0% of outer diameter D of the portion of inner ring 13 opposed to the inner-circumferential-side end face of smaller annular portion 106. In this case, an amount of lubricating oil that flows from a gap between smaller annular portion 106 of cage 14 and inner ring 13 toward tapered roller 12 can be reduced. Consequently, torque loss due to flow resistance of lubricating oil can be reduced.

Thus, with the construction described above, contradictory effects of improvement in seizure resistance at the time of start of rotation and during rotation and reduction in torque loss can be obtained.

In tapered roller bearing 10, a plurality of protrusions 106B may be formed on the surface of smaller annular portion 106 of cage 14 opposed to inner ring 13. In this case, when cage 14 and smaller flange portion 42 of inner ring 13 come in contact with each other at the time of movement of cage 14 in the radial direction of cage 14, owing to formed protrusion 106B, an oil film is formed in the vicinity of protrusion 106B as a result of a wedge effect of lubricating oil, so that direct contact between cage 14 and inner ring 13 is suppressed. Consequently, increase in torque due to direct contact between cage 14 and inner ring 13 can be suppressed.

In tapered roller bearing 10, a grain size number defined under JIS, of a prior austenite crystal grain size in nitrogen enriched layers 11B, 12B, and 13B may be equal to or greater than 10. Since nitrogen enriched layers 11B, 12B, and 13B in which the prior austenite crystal grain size is sufficiently fine are formed in this case, tapered roller bearing 10 having long rolling fatigue life and improved Charpy impact value, fracture toughness value, and ultimate strength can be obtained.

In tapered roller bearing 10, ratio α/L between width L and displacement amount α may be not lower than 0% and lower than 20% where L represents a width of the rolling surface in the direction of extension of the axis of rolling of tapered roller 12 and α represents an amount of displacement from midpoint N of rolling surface 12A in the direction of extension, of a position of abutment between inner-ring raceway surface 13A and rolling surface 12A toward larger end face 16, From a different point of view, the position of abutment is preferably located at a central position of rolling surface 12A in the direction of extension of the axis of rolling or located closer to larger end face 16 than the central position. In this case, a distance from a position of generation of tangential force that generates skew in the roller (a position of contact between larger end face 16 and larger flange surface 18 of inner ring 13) to the position of abutment can be shorter than in an example where the position of abutment is located closer to the smaller end face than the central position of the rolling surface in the direction of extension of the axis of rolling, a skew angle of tapered roller 12 can be made smaller and increase in rotational torque can be suppressed.

In tapered roller bearing 10, in inner ring 13, undercut 25A may be provided in the corner where inner-ring raceway surface 13A and larger flange surface 18 meet each other. In this case, the end of rolling surface 12A of tapered roller 12 on the side of larger end face 16 is located in undercut 25A so that the end can be prevented from coming in contact with inner ring 13.

In tapered roller bearing 10, in the cross-section passing through the central axis of inner ring 13, inner-ring raceway surface 13A and outer-ring raceway surface 11A may be linear or arcuate. Rolling surface 12A of tapered roller 12 may be crowned. A sum of crown drops may be expressed in the y-z coordinate system with the generatrix of the rolling surface of tapered roller 12 being defined as they axis and a direction orthogonal to the generatrix being defined as the z axis by the expression (1) where $K_1$, $K_2$, and $z_m$ represent design parameters, Q represents a load, L represents a length of an effective contact portion of rolling surface 12A of tapered roller 12 along the generatrix, E' represents an equivalent elastic modulus, a represents a length from an origin on the generatrix of rolling surface 12A of tapered roller 12 to an end of the effective contact portion, and A is defined as $A=2K_1Q/\pi LE'$.

[Expression 2]

$$z(y) = A \ln \frac{1}{1 - \left\{1 - \exp\left(-\frac{z_m}{A}\right)\right\}\left(\frac{y-a}{K_2 a} + 1\right)^2} \quad (1)$$

In this case, since rolling surface 12A of roller 12 is provided with a crowning profile having a contour line represented by such a logarithmic function (what is called a logarithmic crowning profile) that the expression (1) represents a sum of drops, local increase in contact pressure can be suppressed and wear of rolling surface 12A of roller 12 can be suppressed as compared with an example where a conventional crowning profile represented by a partially circular arc is provided.

In the cross-section passing through the central axis of inner ring 13, inner-ring raceway surface 13A and outer-ring raceway surface 11A are linear or arcuate, the central portion of rolling surface 12A of tapered roller 12 is formed, for example, as a straight surface, and what is called a logarithmic crowning profile is provided as being continuous to the straight surface. Therefore, a dimension of a region of contact between rolling surface 12A of tapered roller 12, and inner-ring raceway surface 13A and outer-ring raceway surface 11A (for example, a dimension of a major axis of the contact ellipse) can be long, and consequently skew can be suppressed. Furthermore, variation in position of abutment between inner-ring raceway surface 13A or outer-ring raceway surface 11A and rolling surface 12A can be lessened.

With a longer dimension of the region of contact between rolling surface 12A, and inner-ring raceway surface 13A and outer-ring raceway surface 11A (for example, a dimension of the major axis of the contact ellipse) as described above, when the roller is provided with a full crowning profile as in the conventional example, an edge contact pressure may be produced at the end in the direction of the generatrix under such a condition of use that moment load is applied. In tapered roller bearing 10, however, tapered roller 12 is provided with the logarithmic crowning profile and hence production of such an edge contact pressure can be suppressed while a necessary dimension of the region of contact is ensured.

Figure 37:
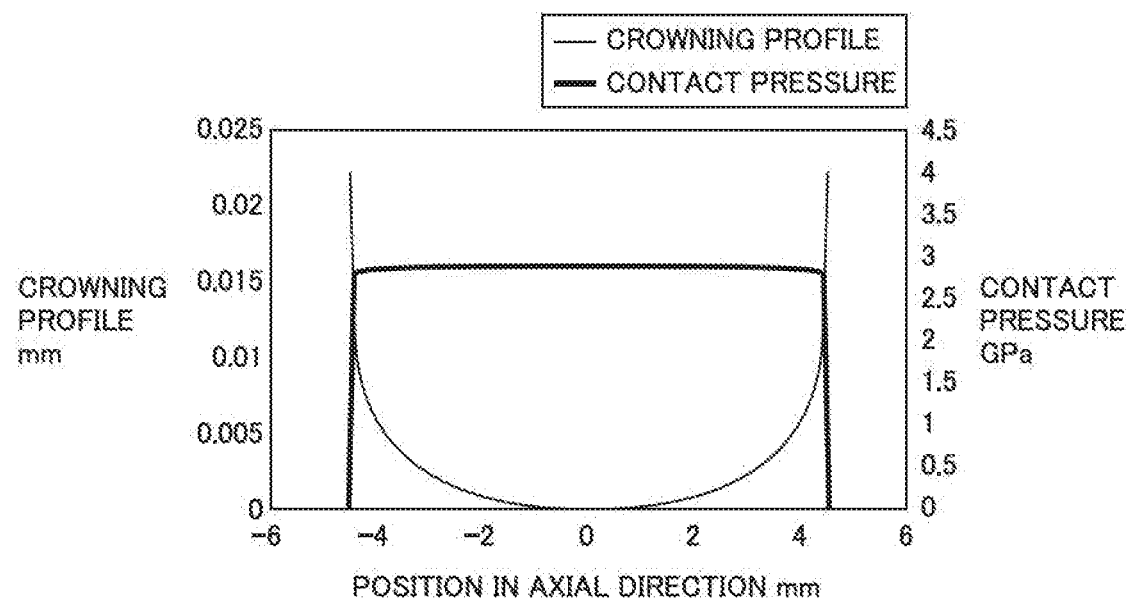
FIG. 37 shows a contour line of a roller provided with a crowning profile of which contour line is expressed by a logarithmic function and a contact surface pressure at a roller rolling surface as being superimposed on each other.
Figure 38:
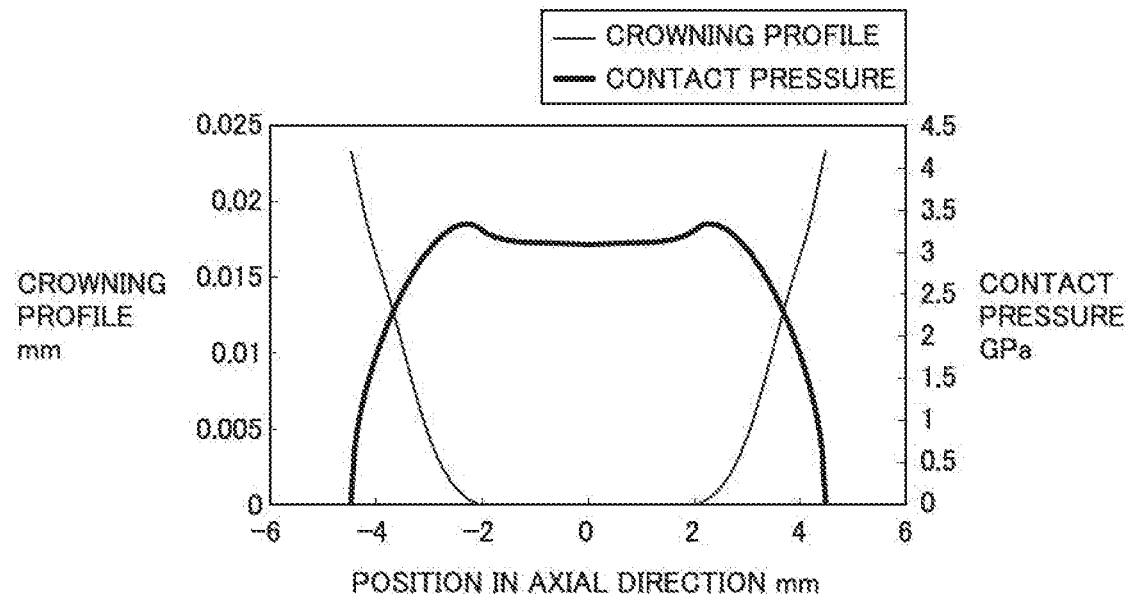
FIG. 38 shows a contour line of a roller in which a portion between a partially arcuate crowning profile and a straight portion is expressed by an auxiliary circular arc and a contact surface pressure at a roller rolling surface as being superimposed on each other.

An effect of the logarithmic crowning profile described above will now be described in more detail. FIG. 37 represents a contour line of a roller provided with a crowning profile with the contour line being represented by a logarithmic function and a contact surface pressure at a roller rolling surface as being superimposed on each other. FIG. 38 represents a contour line of a roller with a portion between a partially arcuate crowning profile and a straight portion being represented by an auxiliary circular arc and a contact surface pressure at a roller rolling surface as being superimposed on each other. In FIGS. 37 and 38, the ordinate on the left side represents drop (unit: mm) of the crowning profile. In FIGS. 37 and 38, the abscissa represents a position in the axial direction in the roller (unit: mm). In FIGS. 37 and 38, the ordinate on the right side represents a contact surface pressure (unit: GPa).

In an example where a contour line of the rolling surface of the tapered roller is formed in a shape including a partially arcuate crowning profile and a straight portion, even though a gradient at a boundary between the straight portion, the auxiliary circular arc, and the crowning profile is continuous as shown in FIG. 38, the contact surface pressure locally increases when the curvature is discontinuous. Therefore, an oil film may break or a surface may be damaged. Unless a lubricating film having a sufficient thickness is formed, wear due to metal-to-metal contact easily occurs. When the contact surface is partially worn, metal-to-metal contact is more likely in the vicinity thereof, which accelerates wear of the contact surface and leads to damage to the tapered roller.

When the rolling surface of the tapered roller serving as a contact surface is provided with a crowning profile defined by a contour line represented by a logarithmic function as shown, for example, in FIG. 37, a local contact pressure is lower and wear of the contact surface is less likely than in an example where a crowning profile represented by a partial circular arc in FIG. 38 is provided. Therefore, even when lubricant present on the rolling surface of the tapered roller is reduced to a small amount or reduced in viscosity and a lubricating film is reduced in thickness, the contact surface can be prevented from being worn and the tapered roller can be prevented from being damaged. FIGS. 37 and 38 show the contour line of the roller with origin O of the abscissa being set at the central portion of the effective contact portion between the inner ring or the outer ring and the roller in a rectangular coordinate system with the abscissa representing the direction of the generatrix of the roller and the ordinate representing a direction orthogonal to the generatrix and show a contact surface pressure as being superimposed on the former with the contact pressure being represented on the ordinate. Thus, tapered roller bearing 10 exhibiting a long lifetime and high durability can be provided by adopting the construction as described above.

In tapered roller bearing 10, ratio $R_{process}/R$ between actual radius of curvature $R_{process}$ and set radius of curvature R may be equal to or higher than 0.8. When tapered roller bearing 10 is used in an extremely severe lubrication environment, by setting ratio $R_{process}/R$ to 0.8 or higher, the oil film in the portion of contact between larger end face 16 of tapered roller 12 and larger flange surface 18 of inner ring 13 can have a sufficiently large thickness.

In tapered roller bearing 10, arithmetic mean roughness Ra of larger end face 16 of tapered roller 12 may be not greater than 0.10 μm. In this case, the thickness of the oil film in the portion of contact between larger end face 16 of tapered roller 12 and larger flange surface 18 of inner ring 13 can sufficiently be ensured.

Relation between a skew angle of tapered roller 12 and ratio $R/R_{BASE}$ is discussed. Ratio $R/R_{BASE}$ assumes such a condition that larger end face 16 of tapered roller 12 is in a state of contact at a set ideal spherical surface (not including a working error). Table 4 shows relation between ratio $R/R_{BASE}$ and a skew angle of tapered roller 12.

TABLE 4

| Ratio $R/R_{BASE}$ (%) | 1 | 0.95 | 0.9 | 0.85 | 0.8 | 0.75 |
|---|---|---|---|---|---|---|
| Skew Angle | 0 | 0.03 | 0.06 | 0.09 | 0.12 | 0.15 |

As shown in Table 4, as ratio $R/R_{BASE}$ of a roller is lower, a skew angle is larger. Radius of curvature R of larger end face 16 of roller 12 in already described FIG. 4 is a radius of curvature at the time when larger end face 16 is defined by an ideal spherical surface, and larger end face 16 is defined by an ideal single arcuate curve that satisfies a condition of R152=R364=R1564 as shown in FIG. 21. In actual, however, as shown in FIG. 22, larger end face 16 of tapered roller 12 is not defined by a part of one spherical surface around the apex of the cone angle of tapered roller 12. As shown in FIG. 22, R152 on one side is not equal to R1564 of the entire larger end face 16 but smaller than R1564.

When opposing end faces of larger end face 16 of roller 12 sag as shown in FIG. 22, larger end face 16 and larger flange surface 18 of inner ring 13 come in contact with each other only on one side (projection 16A) of larger end face 16. Therefore, a mathematical R dimension of larger end face 16 is set to R152 (actual radius of curvature $R_{process}$ in FIG. 22) and is smaller than the ideal R dimension (set radius of curvature R) (ratio $R_{process}/R$ is lower). Consequently, a contact surface pressure between larger flange surface 18 and larger end face 16 increases and at the same time the skew angle also increases. With increase in skew angle, the contact ellipse produced at the portion of contact between roller 12 and larger flange surface 18 extends out of larger flange surface 18, which leads to break of the oil film and consequently to galling or seizure.

In an environment where a lubrication state is insufficient, as the skew angle of roller 12 increases and additionally the contact surface pressure in the portion of contact between larger flange surface 18 and larger end face 16 increases, a parameter A of the oil film between roller 12 and larger flange surface 18 is lowered. As oil film parameter A is lower than 1, a state of boundary lubrication in which metal-to-metal contact starts is set. Consequently, wear starts to occur in the portion of contact between larger end face 16 of roller 12 and larger flange surface 18 of the inner ring. As this state continues, wear further progresses and concern about seizure grows.

Oil film parameter A is defined as "a ratio between an oil film thickness h and composite roughness σ of root mean roughness of a larger end face of a roller and a larger flange surface of an inner ring found based on elastohydrodynamic lubrication theory." In other words, oil film parameter Λ is expressed as Λ=h/σ. Arithmetic mean roughness Ra and root mean roughness Rq generally satisfy relation of Rq=1.25 Ra. Composite roughness σ can be expressed as $\sigma=\sqrt{((Rq_1^2+Rq_2^2)/2)}$ by using Rq, where $Rq_1$ represents root mean roughness of the larger end face of the roller and $Rq_2$ represents root mean roughness of the larger flange surface.

Oil film parameter Λ is dependent on composite roughness σ, and the oil film thickness can be larger as a value of σ is smaller. Therefore, surface roughness of larger end face 16 of roller 12 and larger flange surface 18 of inner ring 13 is comparable to superfinishing, and the value of σ is desirably not greater than 0.09 μm Rq.

Based on a result of studies about influence by a difference between set radius of curvature R and the radius of curvature of the larger end face of the tapered roller (an actual radius of curvature $R_{ACTUAL}$) in grinding described above, attention was paid to a ratio between actual radius of curvature $R_{ACTUAL}$ and set radius of curvature R and relation with a contact surface pressure between the larger end face and the larger flange surface, an oil film thickness, a skew angle, and an oil film parameter was verified. Furthermore, a severity level of a lubrication state at the time when a temperature of use of lubricating oil between the larger flange surface of the inner ring and the larger end face of the tapered roller that come in sliding contact with each other attained to the peak was found to affect verification of a practical range of the ratio between actual radius of curvature $R_{ACTUAL}$ and set radius of curvature R.

Therefore, an indicator indicating the severity level of the lubrication state at the time when the temperature of use of lubricating oil between the larger flange surface of the inner ring and the larger end face of the tapered roller attained to the peak is discussed as below.

(1) Attention was paid to the fact that the lubrication state between the larger flange surface of the inner ring and the larger end face of the tapered roller was determined by a radius of curvature (actual radius of curvature $R_{ACTUAL}$) of the larger end face of the tapered roller and a temperature of use of lubricating oil because the larger flange surface was a conical surface and hence it was linear and constant.

(2) Attention was paid to the fact that, in such applications as a transmission and a differential gear, lubricating oil used was basically fixed and hence viscosity of the lubricating oil was also fixed.

(3) An extremely severe temperature condition that continued for three minutes (180 seconds) at 120° C. was assumed as a maximum condition at the time when the temperature of use of lubricating oil attained to the peak. This temperature condition refers to the maximum condition at the time when the temperature attains to the peak, and means that the state returns to a steady state after lapse of approximately three minutes. This temperature condition is herein referred to as the "assumed peak temperature condition." It was found that a threshold value for setting a ratio between actual radius of curvature $R_{ACTUAL}$ and set radius of curvature R at which abrupt increase in temperature did not occur in the lubrication state set with viscosity characteristics of lubricating oil being incorporated in the "assumed peak temperature condition" could be calculated.

Based on the finding above, it was conceived that the indicator indicating the severity level of the lubrication state could be calculated in an expression below based on the lubrication state set with viscosity of lubricating oil being incorporated in the "assumed peak temperature condition." This indicator is herein referred to as a "flange lubrication coefficient."

"Flange lubrication coefficient"=viscosity at 120° C.×(oil film thickness h)²/180 seconds Oil film thickness h can be calculated based on the Karna expression below.

[Expression 3]

$$h = 1.64 \times 10^{-3} (\eta_0 \bar{u})^{0.74} R_x^{0.41} w^{-0.074} \quad (2)$$

$R_x$: equivalent radius of curvature in direction of motion
$\bar{u}$: average velocity
w: load
$\eta_0$: viscosity at normal atmospheric pressure A tapered roller bearing according to a modification of the embodiment of the present invention will now be described. The tapered roller bearing according to the modification of the present embodiment is different from a general tapered roller bearing in that it is used at a slightly relaxed severity level of a lubrication state set with viscosity characteristics of lubricating oil being incorporated in the "assumed peak temperature condition" and a practical range of the ratio between actual radius of curvature $R_{ACTUAL}$ and that set radius of curvature R of the larger end face of the tapered roller is expanded. Since the tapered roller bearing is otherwise the same in construction and technical contents as the tapered roller bearing according to the first embodiment described above, all contents in the description of the tapered roller bearing according to the embodiment described above are applied mutatis mutandis and only differences will be described.

For the tapered roller bearing according to the modification of the present embodiment, gear oil SAE 75W-90 often used for a differential gear is employed as a sample and the "flange lubrication coefficient" is calculated. Viscosity at 120° C. of 75W-90 is 10.3 cSt (=10.3 mm²/s) and oil film thickness h calculated based on the expression (2) for each value of the ratio between actual radius of curvature $R_{ACTUAL}$ and set radius of curvature R is as shown in Table 5.

TABLE 5

| | | | | | | |
|---|---|---|---|---|---|---|
| Ratio $R_{ACTUAL}/R$ Between Actual Radius of Curvature $R_{ACTUAL}$ and Set Radius of Curvature R | 0.4 | 0.5 | 0.7 | 0.8 | 0.9 | 1.0 |
| Oil Film Thickness h (×10⁻⁴ mm) | 4.419 | 4.999 | 5.725 | 5.983 | 6.137 | 6.122 |

75W-90 was slightly higher in viscosity at 120° C. than VG32, and the lubrication state set with viscosity characteristics of lubricating oil being incorporated in the "assumed peak temperature condition" was slightly more relaxed than in the embodiment described above. This lubrication state is herein referred to as a "severe lubrication state."

The tapered roller bearing according to the modification of the embodiment of the present invention was subjected to a seizure resistance test using a rotary test machine. Test conditions for the seizure resistance test are as below.

<Test Condition>
Applied load: radial load of 4000 N and axial load of 7000 N
The number of revolutions: 7000 min
Lubricating oil: SAE 75W-90
Tested bearing: tapered roller bearing (having an inner diameter of ϕ 35 mm, an outer diameter of ϕ 74 mm, and a width of 18 mm)

Table 6 shows results of a contact surface pressure between the larger end face and the larger flange surface, an oil film thickness, a skew angle, an oil film parameter, and the "flange lubrication coefficient" for each value of the ratio between actual radius of curvature $R_{ACTUAL}$ and set radius of curvature R. Though Table 6 shows each of the contact surface pressure, the oil film thickness, the skew angle, and the oil film parameter as a ratio, a denominator defined as the reference is set to a value at the time when such working that actual radius of curvature $R_{ACTUAL}$ is equal in dimension to set radius of curvature R can be done and 0 is added to each reference character.

TABLE 6

| | | | | | | |
|---|---|---|---|---|---|---|
| Ratio $R_{ACTUAL}/R$ Between Actual Radius of Curvature $R_{ACTUAL}$ and Set Radius of Curvature R | 0.4 | 0.5 | 0.7 | 0.8 | 0.9 | 1.0 |

TABLE 6-continued

| | | | | | | |
|---|---|---|---|---|---|---|
| Contact Surface Pressure Ratio p/p0 Between Larger End Face and Larger Flange Surface | 2.7 | 2.2 | 1.6 | 1.4 | 1.2 | 1 |
| Oil Film Thickness Ratio h/h0 | 0.72 | 0.82 | 0.94 | 0.98 | 1.00 | 1.00 |
| Skew Angle Ratio φ/φ0 | 8 | 5 | 3 | 1.5 | 1.2 | 1 |
| Oil Film Parameter Ratio Λ/Λ0 | 0.72 | 0.82 | 0.94 | 0.98 | 1.00 | 1.00 |
| Flange Lubrication Coefficient (×10⁻⁹) | 12.2 | 14.4 | 18.8 | 20.5 | 21.6 | 21.4 |
| Test Result | (1) A | (2) A | (3) A | (4) A | (5) A | (6) A |
| Overall Determination | (1) C | (2) A | (3) A | (4) A | (5) A | (6) A |

Table 7 shows details of test results (1) to (6) and overall determination (1) to (6) in Table 6.

TABLE 7

| | (1) | (2) | (3) | (4) | (5) | (6) |
|---|---|---|---|---|---|---|
| Test Result | (1) A No particularly large change was observed. | (2) A Same as left | (3) A Same as left | (4) A Same as left | (5) A Same as left | (6) A Same as left |
| Overall Determination | (1) C The "flange lubrication coefficient" far exceeded 8 × 10⁻⁹ and a sufficient oil film was formed, however, the skew angle was large and hence there was a concern about unstable behavior of the roller during rotation of the bearing, Therefore, determination as not good (C was made. | (2) A The skew angle was slightly large, however, the "flange lubrication coefficient" far exceeded 8 × 10⁻⁹ and a sufficient oil film was formed. Therefore, it was determined that development to abrupt damage would not occur and practical use could be made, and determination as good (A) was made. | (3) A The "flange lubrication coefficient" far exceeded 8 × 10⁻⁹, a sufficient oil film was formed, the skew angle was also small, and rotation was stable. No problem in continued use was found and determination as good (A) was made. | (4) A Same as left | (5) A Same as left | (6) A Same as left |

It has been concluded from the results in Tables 6 and 7 that, in the "severe lubrication state" where 75W-90 representing gear oil for a differential gear is used, ratio $R_{ACTUAL}/R$ between actual radius of curvature $R_{ACTUAL}$ and set radius of curvature R is desirably not lower than 0.5. Therefore, in the present embodiment, ratio $R_{ACTUAL}/R$ between actual radius of curvature $R_{ACTUAL}$ and set radius of curvature R is set to 0.5 or higher. By thus introducing the "flange lubrication coefficient" as an indicator indicating the severity level of the lubrication state, a practical range of the ratio between actual radius of curvature $R_{ACTUAL}$ and set radius of curvature R can be expanded. Proper bearing specifications can thus be selected depending on a condition of use.

The tapered roller bearing in the present embodiment is not limited to those in applications of the differential gear but is applicable to a transmission or other applications in the "severe lubrication state."

In setting a practical ratio between actual radius of curvature $R_{ACTUAL}$ and set radius of curvature R, a test for confirmation purpose may be conducted only around a threshold value. A man-hour in design can thus be reduced. In the "severe lubrication state" in Table 6, even when ratio $R_{ACTUAL}/R$ between actual radius of curvature $R_{ACTUAL}$ and set radius of curvature R is 0.4, the sufficient "flange lubrication coefficient" is obtained. When ratio $R_{ACTUAL}/R$ between actual radius of curvature $R_{ACTUAL}$ and set radius of curvature R is 0.4 in the "severe lubrication state" where lubricating oil slightly lower in viscosity than in Table 6 is employed, however, a threshold value not smaller than $8×10^{-9}$ may not be satisfied and the skew angle is also larger. Therefore, ratio $R_{ACTUAL}/R$ between actual radius of curvature $R_{ACTUAL}$ and set radius of curvature R not lower than 0.5 is proper.

For a tapered roller bearing according to another modification of the embodiment of the present invention, turbine oil ISO viscosity grade VG32 which is lubricating oil often used for a transmission is employed as a sample and the "flange lubrication coefficient" is calculated. Viscosity at 120° C. of VG32 is 7.7 cSt (=7.7 mm²/s) and oil film thickness h is calculated based on the expression (2). For each value of the ratio between actual radius of curvature $R_{ACTUAL}$ and set radius of curvature R, oil film thickness h is as shown in Table 8.

TABLE 8

| | | | | | | |
|---|---|---|---|---|---|---|
| Ratio $R_{ACTUAL}/R$ Between Actual Radius of Curvature $R_{ACTUAL}$ and Set Radius of Curvature R | 0.4 | 0.5 | 0.7 | 0.8 | 0.9 | 1.0 |
| Oil Film Thickness h (×10⁻⁴ mm) | 3.343 | 3.782 | 4.332 | 4.527 | 4.624 | 4.632 |

VG32 was low in viscosity at 120° C., and the lubrication state set with viscosity of lubricating oil being incorporated in the "assumed peak temperature condition" was extremely severe. This lubrication state is herein referred to as an "extremely severe lubrication state."

A seizure resistance test using a rotary test machine was conducted together. Test conditions for the seizure resistance test are as below.

<Test Condition>
Applied load: radial load of 4000 N and axial load of 7000 N
Rotation speed: 7000 min$^{-1}$
Lubricating oil: turbine oil ISO VG32
Tested bearing: tapered roller bearing (having an inner diameter of $\phi$ 35 mm, an outer diameter of $\phi$ 74 mm, and a width of 18 mm)

Table 9 shows results of a contact surface pressure between the larger end face and the larger flange surface, an oil film thickness, a skew angle, an oil film parameter, and the "flange lubrication coefficient" for each value of the ratio between actual radius of curvature $R_{ACTUAL}$ and set radius of curvature R. Though Table 9 shows each of the contact surface pressure, the oil film thickness, the skew angle, and the oil film parameter as a ratio, a denominator defined as the reference is set to a value at the time when such working that actual radius of curvature $R_{ACTUAL}$ is equal in dimension to set radius of curvature R can be done and 0 is added to each reference character.

It has been concluded from the results in Tables 9 and 10 that, in the "extremely severe lubrication state" where VG32 being low in viscosity and representing transmission oil is used, ratio $R_{ACTUAL}/R$ between actual radius of curvature $R_{ACTUAL}$ and set radius of curvature R is desirably not lower than 0.8. Therefore, for the tapered roller bearing according to another modification of the present embodiment, ratio $R_{ACTUAL}/R$ between actual radius of curvature $R_{ACTUAL}$ and set radius of curvature R is set to 0.8 or higher.

The tapered roller bearing described above is not limited to those in the applications of the transmission but is applicable to a differential gear or other applications in the "extremely severe lubrication state."

The following was found based on the results in Tables 9 and 10. As the calculated "flange lubrication coefficient" and the results in the seizure resistance test were checked against each other, practicability could be confirmed by setting ratio $R_{ACTUAL}/R$ between actual radius of curvature $R_{ACTUAL}$ and set radius of curvature R such that the "flange lubrication coefficient" exceeded $8 \times 10^{-9}$. The "flange lubrication coefficient"=$8 \times 10^{-9}$ can be adopted as a threshold value for setting practical ratio $R_{ACTUAL}/R$ between actual radius of curvature $R_{ACTUAL}$ and set radius of curvature R.

<Method of Manufacturing Tapered Roller Bearing>

Figure 39:
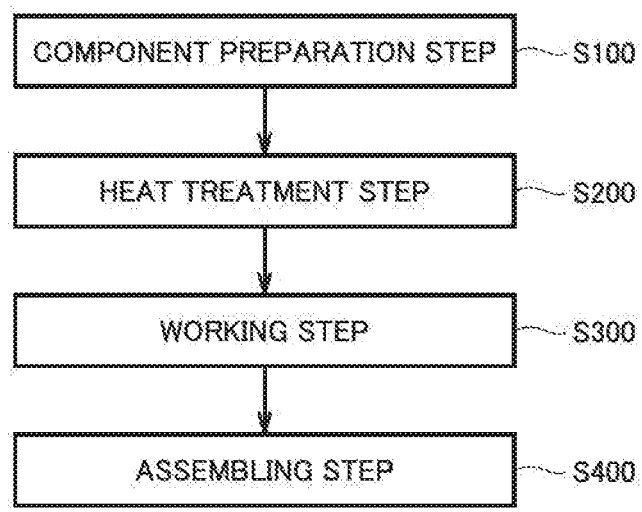
FIG. 39 is a flowchart of a method of manufacturing a tapered roller bearing according to the embodiment.
Figure 40:
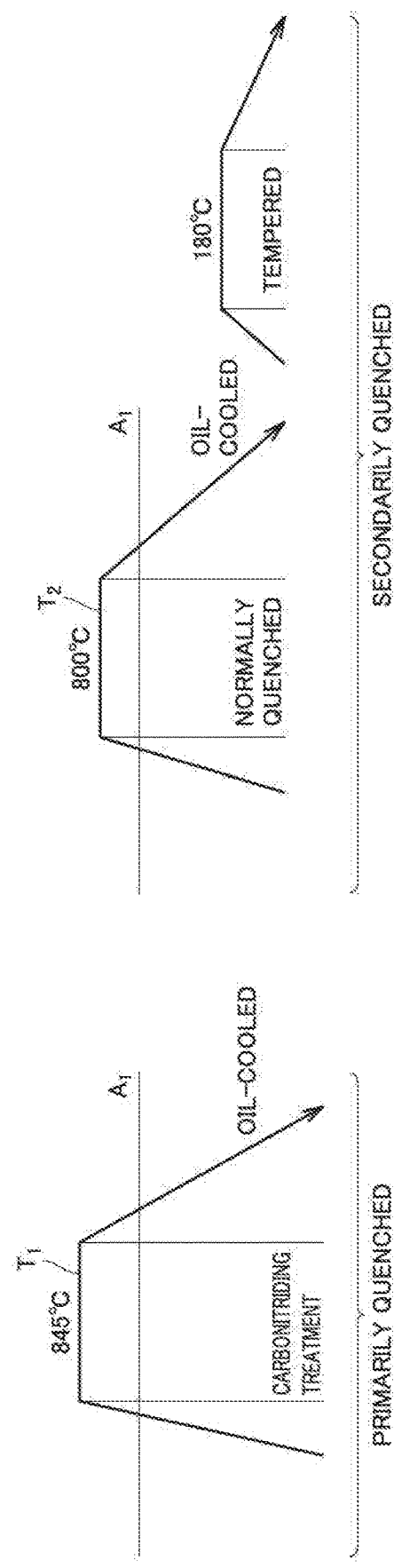
FIG. 40 is a diagram for illustrating a heat treatment method in the embodiment.

FIG. 39 is a flowchart for illustrating a method of manufacturing the tapered roller bearing shown in FIG. 1. FIG. 40

TABLE 9

| | | | | | | |
|---|---|---|---|---|---|---|
| Ratio $R_{ACTUAL}/R$ Between Actual Radius of Curvature $R_{ACTUAL}$ and Set Radius of Curvature R | 0.4 | 0.5 | 0.7 | 0.8 | 0.9 | 1.0 |
| Contact Surface Pressure Ratio p/p0 Between Larger End Face and Larger Flange Surface | 2.7 | 2.2 | 1.6 | 1.4 | 1.2 | 1 |
| Oil Film Thickness Ratio h/h0 | 0.72 | 0.82 | 0.94 | 0.98 | 1.00 | 1.00 |
| Skew Angle Ratio $\phi/\phi 0$ | 8 | 5 | 3 | 1.5 | 1.2 | 1 |
| Oil Film Parameter Ratio $\Lambda/\Lambda 0$ | 0.72 | 0.82 | 0.94 | 0.98 | 1.00 | 1.00 |
| Flange Lubrication Coefficient ($\times 10^{-9}$) | 4.78 | 6.12 | 8.03 | 8.77 | 9.14 | 9.18 |
| Test Result | (1) C | (2) B | (3) B | (4) A | (5) A | (6) A |
| Overall Determination | (1) C | (2) C | (3) B | (4) A | (5) A | (6) A |

Figure 41:
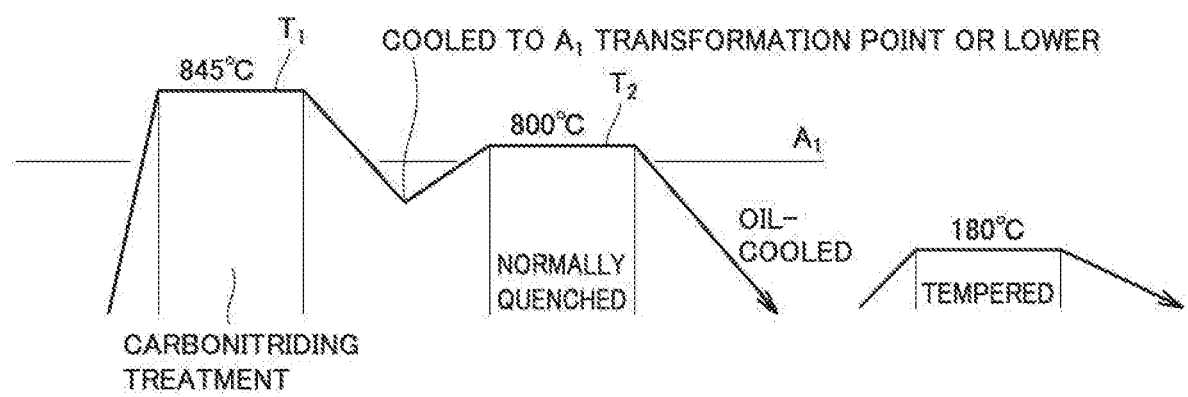
FIG. 41 is a diagram for illustrating a modification to the heat treatment method in the embodiment.

Table 10 shows details of test results (1) to (6) and overall determination (1) to (6) in Table 9.

is a schematic diagram representing a heat treatment pattern in a heat treatment step in FIG. 39. FIG. 41 is a schematic

TABLE 10

| | (1) C | (2) B | (3) B | (4) A | (5) A | (6) A |
|---|---|---|---|---|---|---|
| Test Result | The temperature abruptly increased. | Strong contact between the roller larger end face and the inner ring larger flange surface was observed. | Same as left | No particularly large change was observed. | Same as left | Same as left |
| | (1) C | (2) C | (3) B | (4) A | (5) A | (6) A |
| Overall Determination | The "flange lubrication coefficient" was low, contact was strong, and the skew angle was large. Therefore, determination as not good (C) was made. | The "flange lubrication coefficient" was low, contact was strong, and the skew angle was slightly large. Therefore, there was a concern about unstable behavior of the roller during rotation of the bearing and determination as not good (C) was made. | The "flange lubrication coefficient" was low and contact was strong, however, the skew angle was approximately small. Therefore, it was determined that immediate development to abrupt damage would not occur and determination as acceptable (B) was made. | The "flange lubrication coefficient" far exceeded $8 \times 10^{-9}$, a sufficient oil film was formed, the skew angle was also small, and rotation was stable. No problem in continued use was found and determination as good (A) was made. | Same as left | Same as left | diagram representing a modification to the heat treatment pattern shown in FIG. 40. A method of manufacturing tapered roller bearing 10 will be described below.

As shown in FIG. 39, initially, a component preparation step (S100) is performed. In this step (S100), members to be bearing components such as outer ring 11, inner ring 13, roller 12, and cage 14 are prepared. A member to be roller 12 is uncrowned, and a surface of the member is yet-to-be-worked surface 12E shown with a dotted line in FIG. 13.

Then, a heat treatment step (S200) is performed. In this step (S200), prescribed heat treatment is performed to control characteristics of the bearing components. For example, in order to form nitrogen enriched layer 11B, 12B, or 13B according to the present embodiment in at least any one of outer ring 11, roller 12, and inner ring 13, carbonitriding or nitriding, quenching, tempering, and the like are performed. An exemplary heat treatment pattern in this step (S200) is shown in FIG. 40. FIG. 40 shows a heat treatment pattern representing a method of performing primary quenching and secondary quenching. FIG. 41 shows a heat treatment pattern representing a method in which a material is cooled to a temperature lower than an $A_1$ transformation point during quenching and thereafter the material is reheated and finally quenched. In these figures, in treatment $T_1$, carbon, nitrogen, and the like are diffused through a steel matrix and carbon is sufficiently dissolved therein, and thereafter the material is cooled to a temperature lower than the $A_1$ transformation point. Then, in treatment $T_2$ in the figure, the material is reheated to a temperature lower than in treatment $T_1$ and oil-quenched. Thereafter, the material is tempered, for example, at a heating temperature of 180° C.

According to the heat treatment, as compared with ordinary quenching, that is, carbonitriding treatment followed by quenching once, cracking strength can be improved and a rate of change in dimension over time can be lowered while a surface layer portion of a bearing component is carbonitrided. According to the heat treatment step (S200), such a microstructure as shown in FIG. 24 that a grain size of prior austenite crystal grains is not greater than ½ of that in a microstructure in the conventional quenched structure shown in FIG. 25 can be obtained in nitrogen enriched layers 11B, 12B, and 13B having a quenched structure. The bearing component subjected to the above heat treatment has a long life against rolling fatigue and increased cracking strength, and can also achieve a reduced rate of change in dimension over time.

Then, a working step (S300) is performed. In this step (S300), the material is finished to have a final shape of each bearing component. Roller 12 is provided with crowning profile 22A and chamfered portion 21 by machining such as cutting, as shown in FIG. 29.

Then, an assembling step (S400) is performed. In this step (S400), tapered roller bearing 10 shown in FIG. 1 is obtained by assembling the bearing components prepared as described above. Thus, tapered roller bearing 10 shown in FIG. 1 can be manufactured.

<Exemplary Application of Tapered Roller Bearing>

Figure 42:
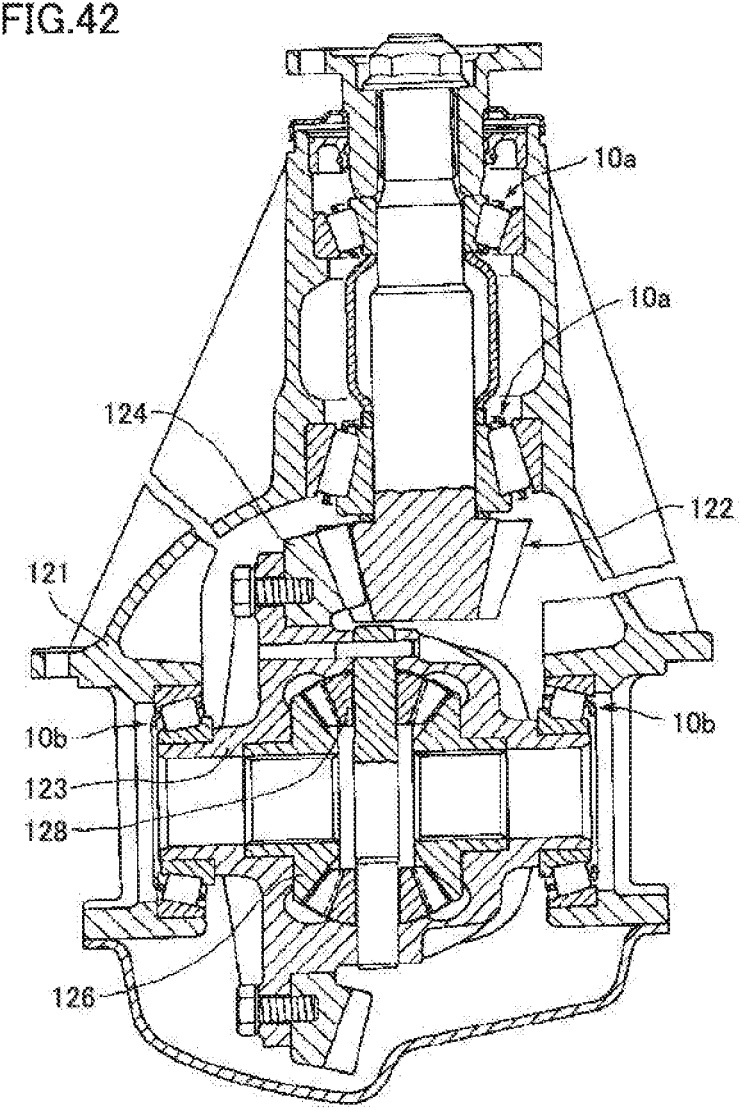
FIG. 42 is a vertical cross-sectional view of a differential gear including the tapered roller bearing according to the embodiment.

An exemplary application of the tapered roller bearing according to the present embodiment will now be described. The tapered roller bearing according to the present embodiment is suitably incorporated in a powertrain of an automobile such as a differential gear or a transmission. The tapered roller bearing according to the present embodiment is suitably used as a tapered roller bearing for an automobile. FIG. 42 shows a differential gear of an automobile including tapered roller bearing 10 described above. The differential gear is such that a drive pinion 122 coupled to a propeller shaft (not shown) and inserted through a differential case 121 is meshed with a ring gear 124 attached to a differential gear case 123 and a pinion gear 125 attached inside differential gear case 123 is meshed with a side gear 126 coupled to a drive shaft (not shown) inserted through differential gear case 123 from right and left sides so that driving force from an engine is transmitted from the propeller shaft to the left and right drive shafts. In this differential gear, drive pinion 122 serving as a power transmission shaft and differential gear case 123 are supported by a pair of tapered roller bearings 10a and a pair of tapered roller bearings 10b, respectively.

Figure 43:
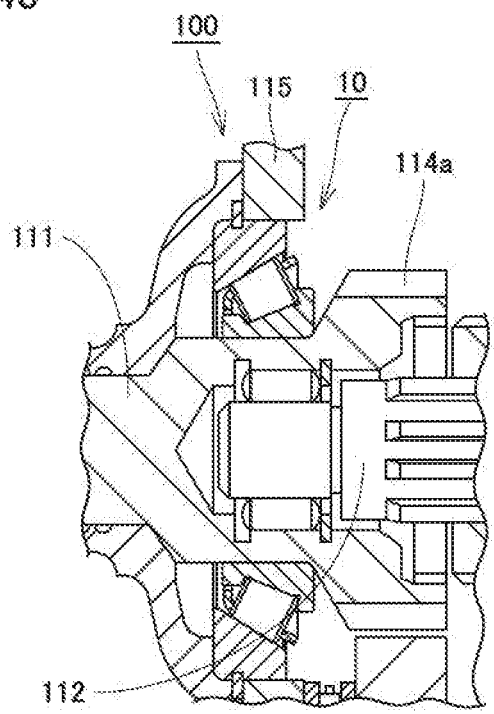
FIG. 43 is a schematic cross-sectional view showing a construction of a manual transmission including the tapered roller bearing according to the embodiment.

FIG. 43 is a schematic cross-sectional view showing a partial construction of a manual transmission including the tapered roller bearing according to the embodiment. As shown in FIG. 43, a manual transmission 100 includes an input shaft 111 that receives input of rotation of the engine and has a gear 114 formed around an outer circumference and an output shaft 112 provided coaxially with input shaft 111. Input shaft 111 is rotatably supported by tapered roller bearing 10 with respect to a housing 115.

As described above, manual transmission 100 includes tapered roller bearing 10 for rotatably supporting input shaft 111 as a rotary member with respect to housing 115 arranged adjacent thereto. Thus, tapered roller bearing 10 according to the embodiment can be used in manual transmission 100. Tapered roller bearing 10 with long lifetime and high durability is suitable for use in manual transmission 100 in which a high contact pressure is applied between a rolling element and a raceway member. Tapered roller bearing 10 may be used for an automatic transmission.

In transmissions, differential gears, or the like which are powertrains for automobiles, viscosity of lubricating oil (oil) is lowered or an amount of oil tends to be reduced for enhanced fuel economy, and formation of a sufficient oil film in a tapered roller bearing may be less likely. Therefore, tapered roller bearings for automobiles are required to achieve longer life. The requirement can be satisfied by incorporating tapered roller bearing 10 achieving longer life into a transmission or a differential gear.

Though the embodiment of the present invention has been described above, the embodiment described above can also variously be modified. The scope of the present invention is not limited to the embodiment described above. The scope of the present invention is defined by the terms of the claims and is intended to include any modifications within the scope and meaning equivalent to the terms of the claims.

REFERENCE SIGNS LIST 10, 10a, 120A, 120B bearing; 11 outer ring; 11A outer-ring raceway surface; 11B, 12B, 13B nitrogen enriched layer; 11C, 12C, 13C unnitrided portion; 12 roller; 12A rolling surface; 12E yet-to-be-worked surface; 13 inner ring; 13A inner-ring raceway surface; 14 cage; 16 larger end face; 16A projection; 16B recess; 16C, 21 chamfered portion; 17 smaller end face; 18 larger flange surface; 18A flank; 19 smaller flange surface; 22, 24 crowned portion; 22A crowning profile; 23 straight portion (central portion); 25A, 25B undercut; 26 centerline; 27 contact area crowned portion; 31 first measurement point; 32 second measurement point; 33 third measurement point; 100 manual transmission; 111 input shaft; 112 output shaft; 113 countershaft; 114a, 114b, 114c, 114d, 114e, 114f, 114g, 114h, 114i, 114j, 114k gear; 115 housing; 121 differential case; 122 drive pinion; 123 differential gear case; 124 ring gear; 125 pinion gear; 126 side gear

The invention claimed is:

1. A tapered roller bearing' comprising:
an outer ring including an outer-ring raceway surface around an inner circumferential surface;
an inner ring arranged inside relative to the outer ring, the inner ring including an inner-ring raceway surface around an outer circumferential surface and a larger flange surface arranged on a larger diameter side relative to the inner-ring raceway surface;
a plurality of tapered rollers disposed between the outer-ring raceway surface and the inner-ring raceway surface, the tapered roller including a rolling surface in contact with the outer-ring raceway surface and the inner-ring raceway surface and a larger end face in contact with the larger flange surface; and
a cage including a plurality of pockets arranged at a prescribed interval in a circumferential direction, the cage accommodating and holding the plurality of tapered rollers in respective ones of the plurality of pockets,
the cage including a smaller annular portion continuous on a smaller diameter side of the plurality of tapered rollers, a larger annular portion continuous on a larger diameter side of the plurality of tapered rollers, and a plurality of posts that couple the smaller annular portion and the larger annular portion to each other, the smaller annular portion, the larger annular portion, and the plurality of posts serving as partitions among the plurality of pockets,
the larger annular portion being provided with an oil retaining hole that faces the pocket and holds lubricating oil,
at least any one of the outer ring, the inner ring, and the plurality of tapered rollers including a nitrogen enriched layer formed on a surface layer of the outer-ring raceway surface, the inner-ring raceway surface, or the rolling surface,
a value of a ratio $R/R_{BASE}$ being not smaller than 0.75 and not greater than 0.87, where R represents a set radius of curvature of the larger end face of the tapered roller and $R_{BASE}$ represents a distance from an apex of a cone angle of the tapered roller to the larger flange surface of the inner ring,
a ratio $R_{process}/R$ being not lower than 0.5, where $R_{process}$ represents an actual radius of curvature after grinding of the larger end face of the tapered roller and R represents the set radius of curvature.

2. The tapered roller bearing according to claim 1, wherein the oil retaining hole includes a bottom located inside the larger annular portion.

3. The tapered roller bearing according to claim 2, wherein
a distance between an inner-circumferential-side end face of the smaller annular portion of the cage and the inner ring is not larger than 1.0% of an outer diameter D of a portion of the inner ring opposed to the inner-circumferential-side end face of the smaller annular portion.

4. The tapered roller bearing according to claim 1, wherein
the larger annular portion includes a pocket-side surface portion that faces the pocket and an inner-ring-side surface portion that is continuous to the pocket-side surface portion and faces the inner ring, and
the oil retaining hole includes an opening provided to extend from the pocket-side surface portion to the inner-ring-side surface portion.

5. The tapered roller bearing according to claim 4, wherein
a distance between an inner-circumferential-side end face of the smaller annular portion of the cage and the inner ring is not larger than 1.0% of an outer diameter D of a portion of the inner ring opposed to the inner-circumferential-side end face of the smaller annular portion.

6. The tapered roller bearing according to claim 1, wherein
the plurality of posts are each provided with an oil groove in a side surface that faces the pocket.

7. The tapered roller bearing according to claim 6, wherein
a distance between an inner-circumferential-side end face of the smaller annular portion of the cage and the inner ring is not larger than 1.0% of an outer diameter D of a portion of the inner ring opposed to the inner-circumferential-side end face of the smaller annular portion.

8. The tapered roller bearing according to claim 1, wherein
a notch is provided in a portion of connection between the plurality of posts and the smaller annular portion.

9. The tapered roller bearing according to claim 8, wherein
a distance between an inner-circumferential-side end face of the smaller annular portion of the cage and the inner ring is not larger than 1.0% of an outer diameter D of a portion of the inner ring opposed to the inner-circumferential-side end face of the smaller annular portion.

10. The tapered roller bearing according to claim 1, wherein
a distance between an inner-circumferential-side end face of the smaller annular portion of the cage and the inner ring is not larger than 1.0% of an outer diameter D of a portion of the inner ring opposed to the inner-circumferential-side end face of the smaller annular portion.

11. The tapered roller bearing according to claim 1, wherein
a surface of the smaller annular portion of the cage opposed to the inner ring is provided with a plurality of protrusions.

12. The tapered roller bearing according to claim 1, wherein
a grain size number defined under JIS, of a prior austenite crystal grain size in the nitrogen enriched layer is equal to or greater than 10.

13. The tapered roller bearing according to claim 1, wherein
in a cross-section passing through a central axis of the inner ring, the inner-ring raceway surface and the outer-ring raceway surface are linear or arcuate,
the rolling surface of the tapered roller is provided with a crowning profile, and
a sum of drops of crowning profiles z(y) is expressed in a y-z coordinate system with a generatrix of the rolling surface of the tapered roller being defined as a y axis and a direction orthogonal to the generatrix being defined as a z axis, in an expression (1)

$$z(y) = A \ln \frac{1}{1 - \left\{1 - \exp\left(-\frac{z_m}{A}\right)\right\}\left(\frac{y-a}{K_2 a} + 1\right)^2} \quad (1)$$

where A represents $2K1Q/\pi LE'$, Q represents a load, K1 represents a multiplying factor for the load Q, L represents a length in a direction of the generatrix, of an effective contact portion of the rolling surface in the tapered roller, E' represents an equivalent elastic modulus, a represents a length from an origin on the generatrix of the rolling surface of the tapered roller to an end of the effective contact portion, K2 represents a ratio of a length of the crowning profile along the generatrix to length a, and zm represents drop at the end of the effective contact portion.

14. The tapered roller bearing according to claim 1, wherein
the larger end face of the tapered roller has arithmetic mean roughness Ra not greater than 0.10 μm.

* * * * *